US008576412B2

(12) United States Patent
Nakanishi

(10) Patent No.: US 8,576,412 B2
(45) Date of Patent: *Nov. 5, 2013

(54) OPTICAL POSITION DETECTION DEVICE, HAND DEVICE, AND DISPLAY DEVICE WITH POSITION DETECTION FUNCTION

(71) Applicant: Seiko Epson Corporation, Tokyo (JP)

(72) Inventor: Daisuke Nakanishi, Matsumoto (JP)

(73) Assignee: Seiko Epson Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/765,348

(22) Filed: Feb. 12, 2013

(65) Prior Publication Data

US 2013/0155028 A1    Jun. 20, 2013

Related U.S. Application Data

(63) Continuation of application No. 12/955,133, filed on Nov. 29, 2010, now Pat. No. 8,400,642.

(30) Foreign Application Priority Data

Dec. 1, 2009    (JP) ................................. 2009-273168

(51) Int. Cl.
*G01B 11/14* (2006.01)

(52) U.S. Cl.
USPC ........................................................ 356/621

(58) Field of Classification Search
USPC ...................... 356/614, 621, 622; 250/559.29
See application file for complete search history.

(56) References Cited

U.S. PATENT DOCUMENTS

| 6,953,926 | B2 | 10/2005 | Reime | |
|---|---|---|---|---|
| 8,378,288 | B2* | 2/2013 | Kiyose | ............... 250/221 |
| 8,400,642 | B2* | 3/2013 | Nakanishi | ............... 356/621 |
| 8,411,289 | B2* | 4/2013 | Takahashi | ............... 356/623 |
| 2003/0020004 | A1 | 1/2003 | Reime | |
| 2009/0295744 | A1 | 12/2009 | Onishi | |
| 2010/0020334 | A1 | 1/2010 | Nakanishi | |

FOREIGN PATENT DOCUMENTS

| JP | 06-099389 | 4/1994 |
|---|---|---|
| JP | 10-002952 | 1/1998 |
| JP | 2003-526236 A | 9/2003 |
| JP | 2003-534554 | 11/2003 |
| JP | 2007-241737 | 9/2007 |

* cited by examiner

*Primary Examiner* — Roy M Punnoose

(74) *Attorney, Agent, or Firm* — Harness, Dickey & Pierce, P.L.C.

(57) ABSTRACT

A position detection device includes: a light source adapted to form a light intensity distribution of a detection light beam; a first detector adapted to receive a reflected light beam of the detection light beam reflected by an object in a detection area where the light intensity distribution is formed; a transmissive member disposed between the detection area and the light source, and between the detection area and the first detector, and having a first surface directed toward the detection area and a second surface directed toward the light source; a second detector adapted to receive a light beam reflected by the second surface out of the detection light beam; a position detector adapted to detect the object based on the detection result in the first detector; and a light blocking member disposed between the second detector and the detection area, and adapted to block the reflected light beam.

7 Claims, 12 Drawing Sheets

OPTICAL POSITION DETECTION DEVICE, HAND DEVICE, AND DISPLAY DEVICE WITH POSITION DETECTION FUNCTION

CROSS-REFERENCE TO RELATED APPLICATIONS

This is a continuation application of U.S. application Ser. No. 12/955,133 filed Nov. 29, 2010 which claims priority to the entire disclosure of Japanese Patent Application No. 2009-273168, filed Dec. 1, 2009 all of which are expressly incorporated by reference herein in their entireties.

BACKGROUND

1. Technical Field

The present invention relates to an optical position detection device for optically detecting the position of a target object, and a hand device and a display device with a position detection function each provided with the optical position detection device.

2. Related Art

As the optical position detection device for optically detecting the position of the target object, there is proposed, for example, a device (see, e.g., JP-T-2003-534554 (Document 1; the term "JP-T" as used herein means a published Japanese translation of a PCT patent application)) of emitting detection light beams respectively from two light beam sources toward the target object via a transmissive member, and then receiving the component of the detection light beams, which are reflected by the target object and transmitted through the transmissive member, by a common light detector.

In the configuration described in Document 1 described above, the position of the target object is detected based on the ratio between the emission intensities of the detection light beams when controlling the two light beam sources so that the receiving intensity of the light detector in the case in which the detection light beam emitted from one of the two light beam sources is reflected by the target object and the receiving intensity of the light detector in the case in which the detection light beam emitted from the other of the two light beam sources is reflected by the target object become equal to each other.

In the configuration described in Document 1, since the method of using the spatial relationship between the detection light beams emitted from the two light beam sources is adopted, it is required to accurately control the emission intensities of the detection light beams from the light beam sources. In order for achieving the above, although it is required to set the emission intensity of the light beam sources while monitoring inspection light beams emitted from the two light beam sources in the condition without the target object, Document 1 fails to propose the configuration therefor.

Further, in the configuration described in Document 1, some of the detection light beam emitted from each of the two light beam sources is reflected by a surface of the transmissive member on the side opposite to the side where the target object is located, and is received by the light detector. Therefore, the reception intensity in the light detector is a result of combining the reception intensity of the detection light beam reflected by the target object and the reception intensity of the light beam other than the detection light beam reflected by the target object. Therefore, there arises a problem that the position detection accuracy is degraded if the position of the target object is detected based on the ratio between the emission intensities of the detection light beams when controlling the two light beam sources so that the receiving intensity of the light detector in the case in which the detection light beam emitted from one light beam source is reflected by the target object and the receiving intensity of the light detector in the case in which the detection light beam emitted from the other light beam source is reflected by the target object become equal to each other.

SUMMARY

An advantage of some aspects of the invention is to provide an optical position detection device in which some of the detection light emitted from the light source section is monitored as a blank light beam having a constant intensity irrespective of presence or absence of the target object and is used for setting the drive condition in the light source section, and the blank light does not hinder detection of the position of the target object, and a hand device and a display device with a position detection function, each having the optical position detection device.

According to an aspect of the invention, there is provided an optical position detection device adapted to optically detect a position of a target object, including a light source section adapted to form a light intensity distribution of a detection light beam in a detection area set in an emission direction of the detection light beam, a first light detector which a position detecting reflected light beam reflected by the target object in the detection area enters and a blank light beam failing to pass through the detection area fails to enter out of the detection light beam emitted from the light source section, a second light detector which the position detecting reflected light beam fails to enter and the blank light beam enters, and a position detection section adapted to detect the target object in the detection area based on the detection result in the first light detector.

In this aspect of the invention, the light source device emits the detection light beam to form the light intensity distribution in the detection area. Further, the position detecting reflected light beam reflected by the target object is detected by the first light detector. Here, since the light intensity distribution has a certain relationship between the position in the detection area and the intensity, by previously figuring out the relationship between the position and the intensity of the detection light beam, the position detection section can detect the position of the target object based on the light reception result of the first light detector. Further, in this aspect of the invention, there is provided the second light detector to which the position detecting reflected light beam reflected by the target object in the detection area out of the detection light beam emitted from the light source section is not input, and the blank light beam not passing through the detection area enters the second light detector. Therefore, since the second light detector can monitor the blank light beam irrespective of whether or not the target object exists in the detection area, it is possible to set the emission intensity of the detection light beam from the light source section to optimum conditions based on the monitoring result. Therefore, since it is not required to monitor the blank light beam by the first light detector, it is possible to adopt the configuration in which the position detecting reflected light beam enters the first light detector while the blank light beam does not enter the first light detector. Therefore, since the influence of the blank light beam is eliminated from the light reception result in the first light detector, the position detection section can detect the position of the target object without being unnecessarily affected by the blank light beam.

In this aspect of the invention, it is preferable that a light blocking member adapted to block the position detecting reflected light beam from entering the second light detector is disposed between the second light detector and the detection area. According to this configuration, the position detecting reflected light beam can be prevented from entering the second light detector only by adding the configuration of providing the light blocking member.

In this aspect of the invention, it is possible to adopt a configuration in which a transmissive member having a first surface directed toward the detection area and a second surface directed toward the light source section is disposed between the light source section and the detection area, and the blank light beam corresponds to a light beam reflected by the second surface of the transmissive member out of the detection light beam emitted from the light source section. According to this configuration, out of the detection light beam emitted from the light source section, the blank light beam can be deflected toward the side on which the second light detector is located.

In this aspect of the invention, it is preferable that the first light detector has a light receiving section disposed close to the second surface of the transmissive member. According to this configuration, the blank light beam can be prevented from entering the first light detector with a relatively simple configuration.

In this aspect of the invention, it is preferable that the second light detector is disposed at a position overlapping the first light detector in the normal direction with respect to the second surface on the side opposite to the side on which the transmissive member is located with respect to the first light detector. According to this configuration, the position detecting reflected light beam can be prevented from entering the second light detector with a relatively simple configuration.

In this aspect of the invention, it is possible to adopt a configuration in which the light source section forms a first light intensity distribution in which the intensity varies in a direction from one side toward the other side in the detection area, and a second light intensity distribution having an intensity variation in a direction from the other side toward the one side different from the first light intensity distribution, and the position detection section detects a position of the target object based on a comparison result between a detection result in the first light detector when forming the first light intensity distribution, and a detection result in the first light detector when forming the second light intensity distribution.

In this aspect of the invention, it is also possible to adopt a configuration in which the light source section forms a first light intensity distribution in which the intensity varies in a direction from one side toward the other side in the detection area, and a second light intensity distribution having an intensity variation in a direction from the other side toward the one side different from the first light intensity distribution, and varies an emission intensity of the detection light beam so that the detection result in the first light detector when forming the first light intensity distribution and the detection result in the first light detector when forming the second light intensity distribution become equal to each other, and the position detection section detects a position of the target object based on one of the emission intensity of the detection light beam from the light source section after varying the emission intensity of the detection light beam and the detection result in the second light detector.

By adopting such a detection method, even in the case in which the environment light enters the first light detector and the second light detector, the position of the target object can be detected without being affected by the environment light.

The optical position detection device to which the invention is applied can be applied to a hand device, and in this case, the hand device is provided with a hand for gripping the target object.

The optical position detection device to which the invention is applied can be applied to the display device with a position detection function, and in this case, the display device with a position detection function is provided with an image generation device for displaying an image in an area overlapping the detection area.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1A:
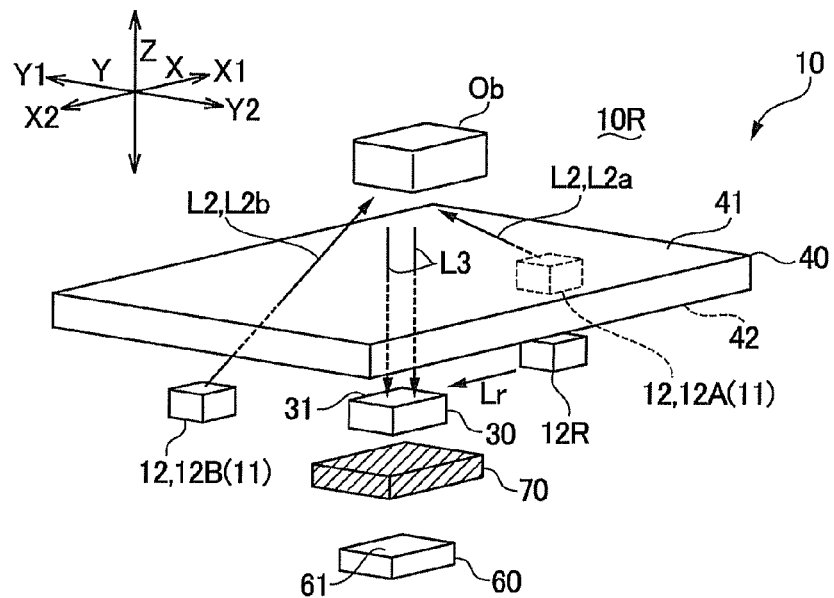
FIGS. 1A and 1B are explanatory diagrams schematically showing a principal part of an optical position detection device according to a first embodiment of the invention.

Hereinafter, some embodiments of the invention will be explained in detail with reference to the accompanying drawings. It should be noted that in the explanation described below it is assumed that X-axis, Y-axis, and Z-axis intersect with each other, and the direction in which the transmissive member and the target object are distant from each other is a Z-axis direction. Further, in the drawings referred to below, things are shown assuming one side of the X-axis direction as an X1 side, the other side thereof as an X2 side, one side of the Y-axis direction as a Y1 side, and the other side thereof as a Y2 side.

First Embodiment

Overall Configuration

Figure 1B:
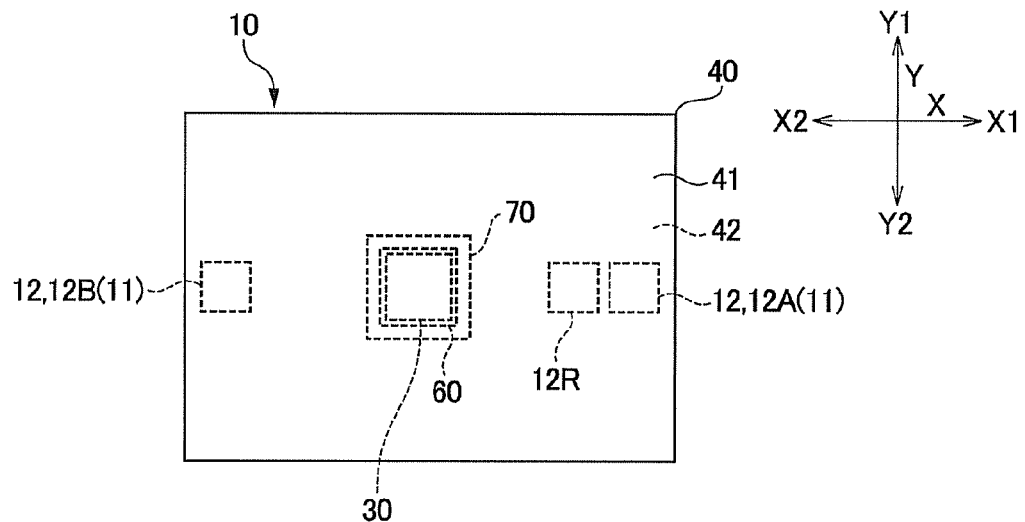
Figure 2:
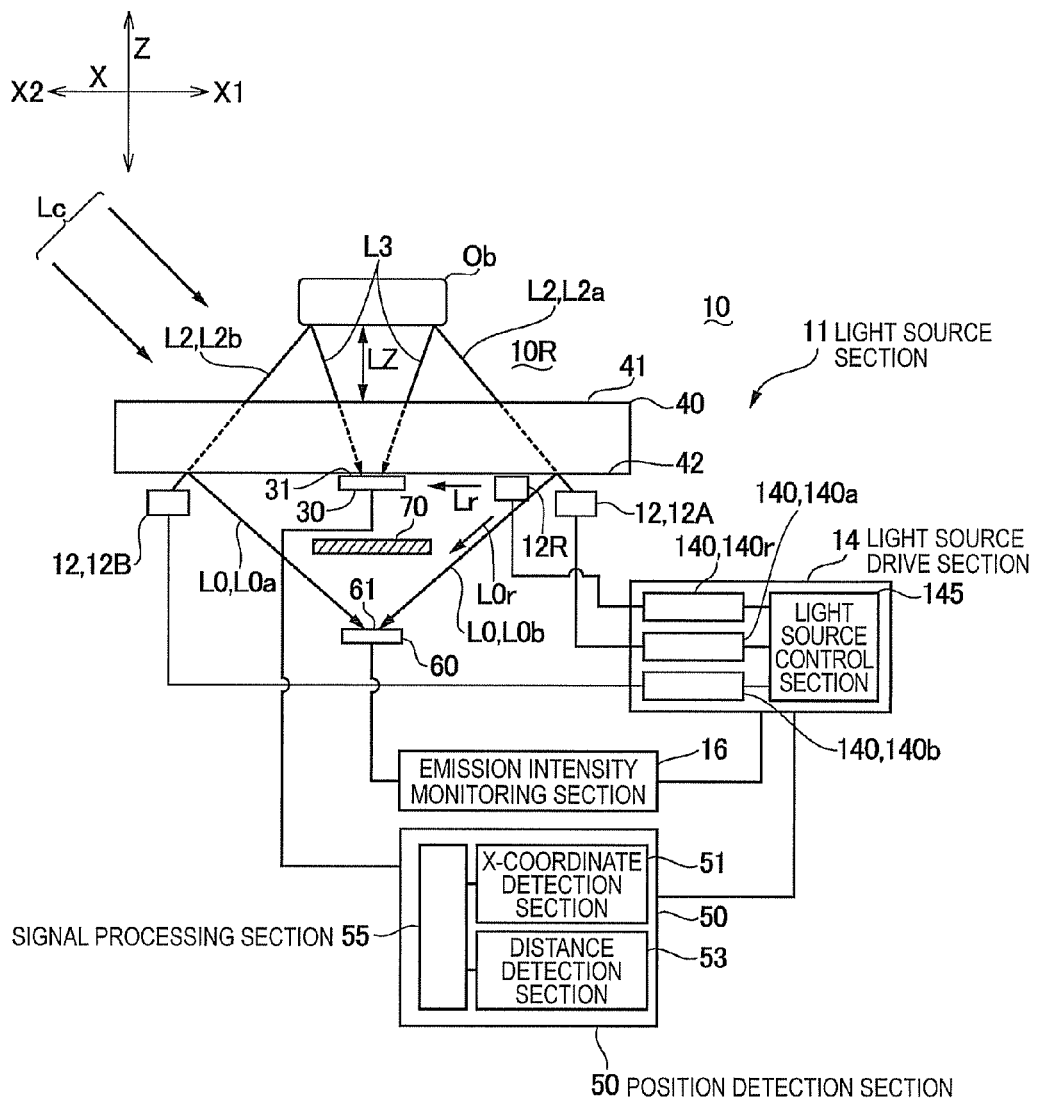
FIG. 2 is an explanatory diagram showing an overall configuration of the optical position detection device according to the first embodiment of the invention.
Figure 3:
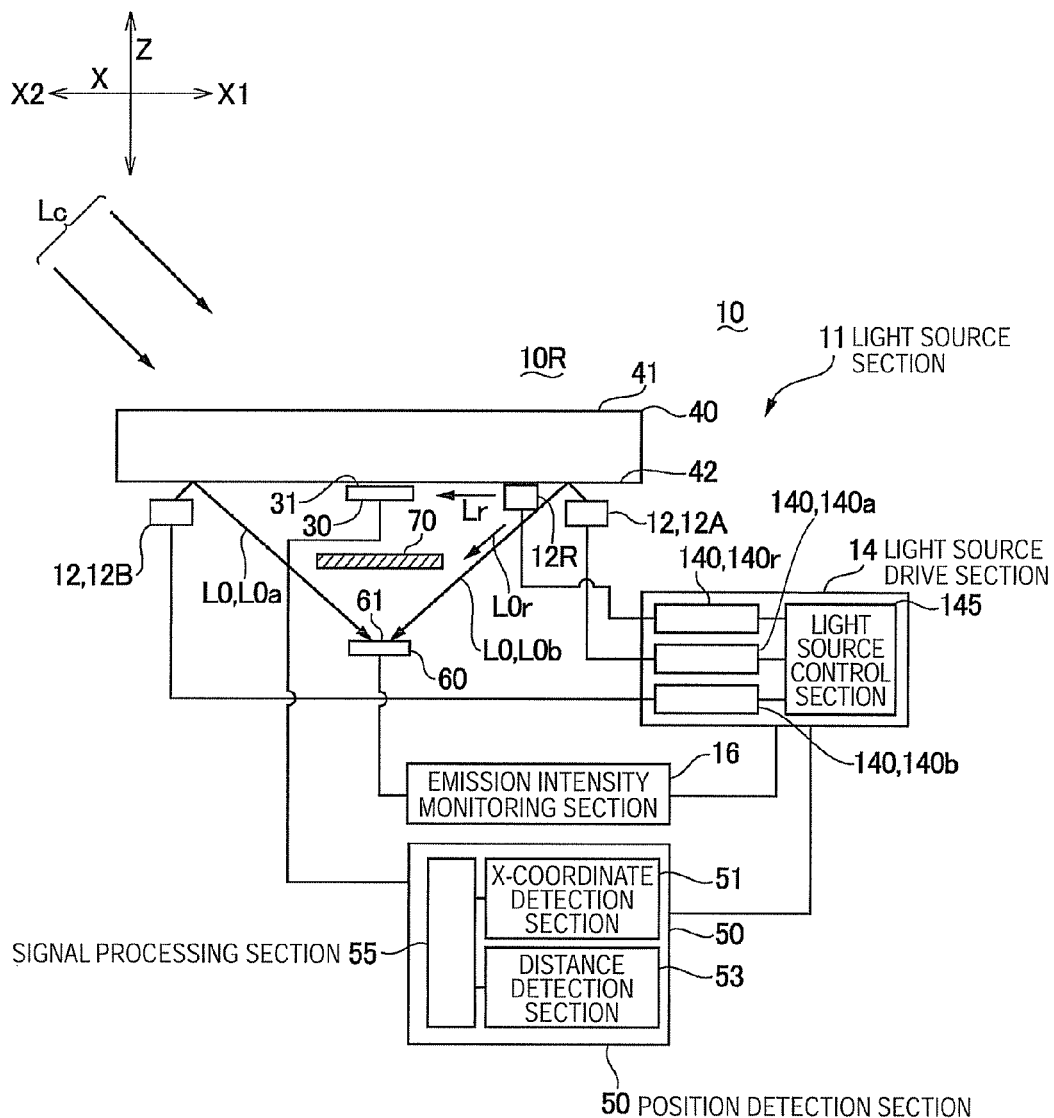
FIG. 3 is an explanatory diagram showing how the blank light beam in the condition in which the target object is absent reaches a second light detector in the optical position detection device according to the first embodiment of the invention.

FIGS. 1A and 1B are explanatory diagrams of a principal part of the optical position detection device according to a first embodiment of the invention, wherein FIG. 1A is an explanatory diagram showing a three-dimensional arrangement of constituents of the optical position detection device, and FIG. 1B is an explanatory diagram showing a two-dimensional arrangement of the constituents of the optical position detection device. FIG. 2 is an explanatory diagram showing an overall configuration of the optical position detection device according to the first embodiment of the invention. FIG. 3 is an explanatory diagram showing how the blank light beam in the condition in which the target object is absent reaches a second light detector in the optical position detection device according to the first embodiment of the invention.

In FIGS. 1A, 1B, and 2, the optical position detection device 10 according to the present embodiment is an optical sensor device for detecting the position of the target object Ob located on the side of a first surface 41 of a transmissive member 40 having a sheet-like shape or a plate-like shape, and is used as a tactile sensor of a robot hand device described later or a touch panel.

In order for performing such detection, the optical position detection device 10 according to the present embodiment is provided with the transmissive member 40 having a sheet-like shape or a plate-like shape and having a first surface 41 directed along the XY plane, a light source section 11 for emitting detection light beams L2 from the side of a second surface 42 opposite to the side of the first surface 41 in the transmissive member 40, and a first light detector 30 for detecting position detecting reflected light beams L3 reflected by the target object Ob and transmitted to the side of the second surface 42 of the transmissive member 40. A light receiving section 31 of the first light detector 30 is opposed to the second surface 42 of the transmissive member 42.

In the present embodiment, the light source section 11 is provided with a plurality of light emitting elements 12, and these light emitting elements 12 are driven by a light source drive section 14 shown in FIG. 2. In the present embodiment, the light source section 11 is provided with two light emitting elements 12A, 12B as the plurality of light emitting elements 12, and the light emitting elements 12A, 12B are located distantly in the X-axis direction and have the respective light emitting surfaces directed toward the transmissive member 40. The light emitting elements 12A, 12B are each composed of a light emitting diode (LED) or the like, and in the present embodiment, the light emitting elements 12A, 12B respectively emit the detection light beams L2 (detection light beams L2a, L2b) of infrared light beams, as diverging light beams.

The first light detector 30 is composed of a photodiode or a phototransistor having the light receiving section 31 directed toward the transmissive member 40, and in the present embodiment, a photodiode is used as the first light detector 30. In the present embodiment, the first light detector 30 is disposed on the side of the second surface 42 of the transmissive member 40, and between the positions at which the two light emitting elements 12A, 12B are disposed.

In the optical position detection device 10 having the configuration described above, a detection area 10R is set on the side of the first surface 41 of the transmissive member 40 (a space on the emission side of the detection light beams L2 from the light source section 11). Therefore, when the light emitting elements 12A, 12B of the light source section 11 are put on sequentially to emit the detection light beams L2a, L2b, the detection light beams L2a, L2b are transmitted through the transmissive member 40, and form respective X-coordinate detecting light intensity distributions (an X-coordinate detecting first light intensity distribution L2Xa and an X-coordinate detecting second light intensity distribution L2Xb) each having the intensity varying along the X-axis direction on the side of the first surface 41 (the detection area 10R) as described later with reference to FIGS. 4A and 4B. In such an X-coordinate detecting first light intensity distribution L2Xa, the intensity decreases in the X-axis direction from the one side X1 to the other side X2, while in the X-coordinate detecting second light intensity distribution L2Xb, the intensity decreases in the X-axis direction from the other side X2 to the one side X1. Such variations can be made to be linear variations by controlling the light intensity distributions within the limited space, namely the detection area 10R. Therefore, in the optical position detection device according to the present embodiment, the position (X-coordinate) of the target object Ob in the in-plane direction (the X-axis direction) of the transmissive member 40 can be detected using the X-coordinate detecting first light intensity distribution L2Xa, the X-coordinate detecting second light intensity distribution L2Xb, and the detection result in the first light detector 30 as described later.

Figure 6A:
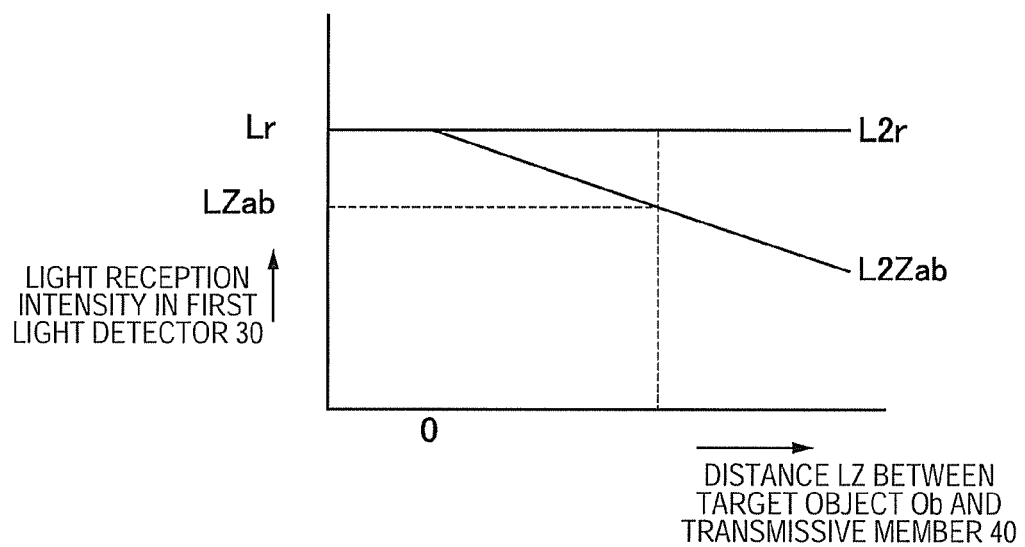
FIGS. 6A and 6B are explanatory diagrams showing the principle of detecting the distance between a transmissive member and the target object in the optical position detection device according to the first embodiment of the invention.
Figure 6B:
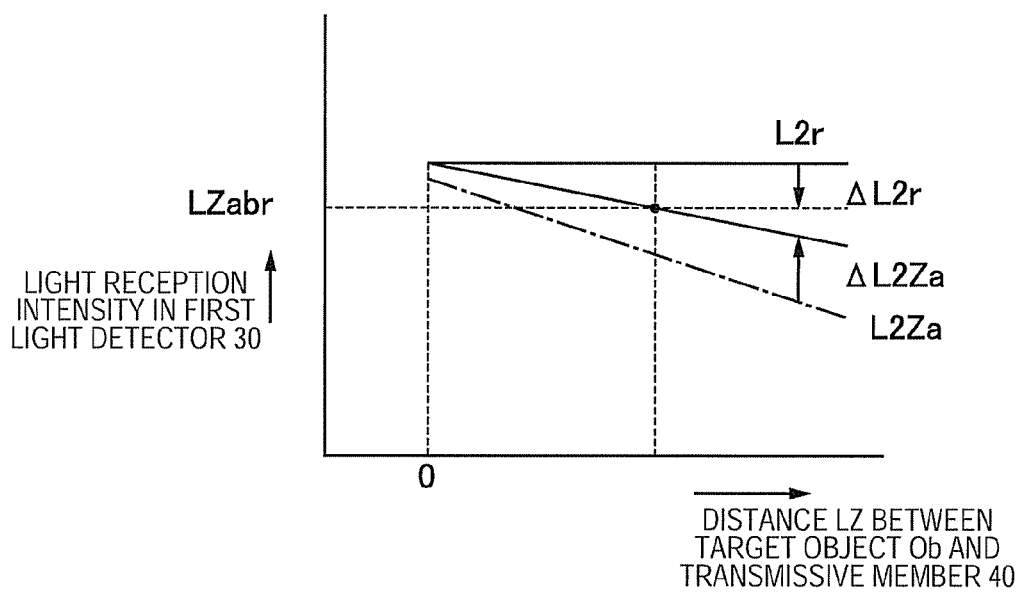

Further, when the light emitting elements 12A, 12B of the light source section 11 are put on simultaneously to emit the detection light beams L2a, L2b, the detection light beams L2a, L2b are transmitted through the transmissive member 40, and form a distance detecting light intensity distribution L2Zab having the intensity varying along the normal direction (the Z-axis direction) with respect to the first surface 41 on the side of the first surface 41 (the detection area 10R) as described later with reference to FIGS. 6A and 6B. In such a distance detecting light intensity distribution L2Zab, the intensity decreases monotonically along the direction of increasing the distance from the first surface 41 of the transmissive member 40, and such a variation can be made to be a linear variation by controlling the light intensity distribution within the limited space of the detection area 10R. Further, in the distance detecting light intensity distribution L2Zab, the intensity is constant along the X-axis direction. Therefore, in the optical position detection device 10 according to the present embodiment, as described later, the distance LZ (the Z-coordinate) between the target object Ob and the transmissive member 40 can be detected using the distance detecting light intensity distribution L2Zab and the detection result in the first light detector 30.

In the present embodiment, for the purpose of canceling an influence of outside light, the light source section 11 of the optical position detection device 10 is also provided with a light emitting element 12R for reference, which emits a reference light beam L2r toward the first light detector 30. Similarly to the light emitting elements 12 (the light emitting element 12A, 12B) for position detection, the light emitting element 12R for reference is also composed of a light emitting diode (LED) or the like, and the light emitting element 12R emits the reference light beam L2r, which is an infrared light beam, as a diverging light beam. It should be noted that the light emitting element 12R for reference is provided with a light blocking cover (not shown), so that the reference light beam L2r emitted from the light emitting element 12R for reference does not enter the side (the detection area 10R) of the first surface 41 of the transmissive member 40.

Configuration of Second Light Detector

As shown in FIGS. 1A, 1B, and 2, in the optical position detection device 10 the first light detector 30 is located on the side of the second surface 42 of the transmissive member 40 and has the light receiving section 31 directed toward the second surface 42, and the light receiving section 31 is disposed close to the second surface 42.

Further, in the optical position detection device 10 according to the present embodiment, on the side of the second surface 42 of the transmissive member 40 there is disposed a second light detector 60, and the second light detector 60 also has a light receiving section 61 directed toward the second surface 42 similarly to the first light detector 30. Similarly to the first light detector 30, the second light detector 60 is composed of a photodiode or a phototransistor, and in the present embodiment, a photodiode is used as the second light detector 60.

Here, the second light detector 60 is disposed at a position overlapping the first light detector 30 in the normal direction with respect to the second surface 42 on the side opposite to the side where the transmissive member 40 is located with respect to the first light detector 30. Further, in a space between the first light detector 30 and the second light detector 60 included in a space between the transmissive member 40 and the second light detector 60, there is disposed a plate-like light blocking member 70 capable of blocking infrared light beams, and therefore the light blocking member 70 intervenes between the detection area 10R and the second light detector 60. The light blocking member 70 has a size slightly larger than that of the second light detector 60, and has a predetermined distance from the second light detector 60.

In the optical position detection device 10 configured as described above, when the light source section 11 emits the detection light beams L2 (the detection light beams L2a, L2b) toward the side where the transmissive member 40 and the detection area 10R are located, some of each of the detection light beams L2 is transmitted through the transmissive member 40, and forms the light intensity distribution in the detection area 10R. Further, some of each of the detection light beams L2 (the detection light beams L2a, L2b) emitted from the light source section 11 becomes the blank light beam L0 (a detection light beam L0a or a detection light beam L0b), which is reflected by the second surface 42 of the transmissive member 40, and fails to reach the detection area 10R.

Here, since the light receiving section 31 of the first light detector 30 is opposed to the second surface 42, the position detecting reflected light beams L3 reflected by the target object Ob in the detection area 10R enter the first light detector 30. It should be noted that since the light receiving section 31 of the first light detector 30 is close to the second surface 42, the blank light beams L0, which are reflected by the second surface 42 of the transmissive member 40 and fail to pass through the detection area 10R, fail to enter the first light detector 30.

In contrast thereto, since the first light detector 30 and the light blocking member 70 intervene between the second light detector 60, and the transmissive member 40 and the detection area 10R, the position detecting reflected light beams L3 reflected by the target object Ob in the detection area 10R fail to enter the second light detector 60. It should be noted that since the light blocking member 70 is fairly small in view of the size of the transmissive member 40 and the distance between the light emitting elements 12, the blank light beams L0, which are reflected by the second surface 42 of the transmissive member 40 and fail to reach the detection area 10R, enter the second light detector 60.

It should be noted that in the present embodiment, environment light Lc such as outside light enters both of the first light detector 30 and the second light detector 60. Further, the reference light beam L2r emitted from the light emitting element 12R for reference partially enters the first light detector 30, and partially enters the second light detector 60 as the blank light beam L0r.

Configuration of Position Detection Section etc.

As shown in FIG. 2, in the optical position detection device 10 according to the present embodiment, the light source drive section 14 of the light source section 11 is provided with a light source drive circuit 140 for driving the light emitting elements 12 and so on, and a light source control section 145 for controlling a lighting pattern of each of the plurality of light emitting elements 12 via the light source drive circuit 140. The light source drive circuit 140 is provided with a light source drive circuit 140a for driving the light emitting element 12A, a light source drive circuit 140b for driving the light emitting element 12B, and a light source drive circuit 140r for driving the light emitting element 12R for reference. The light source control section 145 controls all of the light source drive circuits 140a, 140b, and 140r.

The position detection section 50 is electrically connected to the first light detector 30, and the detection result in the first light detector 30 is output to the position detection section 50. The position detection section 50 is provided with a signal processing section 55 provided with an amplifier and so on, an X-coordinate detection section 51, and a distance detection section 53 (a Z-coordinate detection section), and the light source drive section 14 and the position detection section 50 operate in conjunction with each other to perform the position detection described later.

An emission intensity monitoring section 16 is electrically connected to the second light detector 60, and the detection result in the second light detector 60 is output to the emission intensity monitoring section 16. Such an emission intensity monitoring section 16 monitors the emission intensity of each of the light emitting elements 12 (the light emitting elements 12A, 12B) for position detection and the light emitting element 12R for reference based on the detection result of the blank light beams L0 by the second light detector 60, and the light source control section 145 sets an initial value of the emission intensity of each of the light emitting elements 12 (the light emitting elements 12A, 12B) for position detection and the light emitting element 12R for reference based on the monitoring result.

Initial Setting of Emission Intensities of Light Emitting Elements 12 and 12R

FIG. 3 is an explanatory diagram showing how the blank light beams L0 in the condition in which the target object Ob is absent reach the second light detector 60 in the optical position detection device 10 according to the first embodiment of the invention. As shown in FIG. 3, in order for setting the initial values of the emission intensities of the light emitting elements 12 (the light emitting elements 12A, 12B) for position detection and the light emitting element 12R for reference in the optical position detection device 10 according to the present embodiment, the light emitting elements 12A, 12B, 12R are put on sequentially in the condition in which the target object Ob is absent from the detection area 10R, and the light source control section 145 sets the initial values of the emission intensities of the light emitting elements 12A, 12B, and 12R based on the detection result of the blank light beams L0 (the blank light beams L0a, L0b, and L0r) in the second light detector 60 at that time.

Detection of X Coordinate

In the optical position detection device 10 according to the present embodiment, since the two light emitting elements (the light emitting elements 12A, 12B) are disposed at positions distant from each other in the X-axis direction, the X-coordinate of the target object Ob can be detected using the light intensity distribution formed by the light emitting element 12A and the light intensity distribution formed by the light emitting element 12B. Therefore, the configuration of the light intensity distribution and the principle of the X-coordinate detection will be explained with reference to FIGS. 4A and 4B.

Figure 4A:
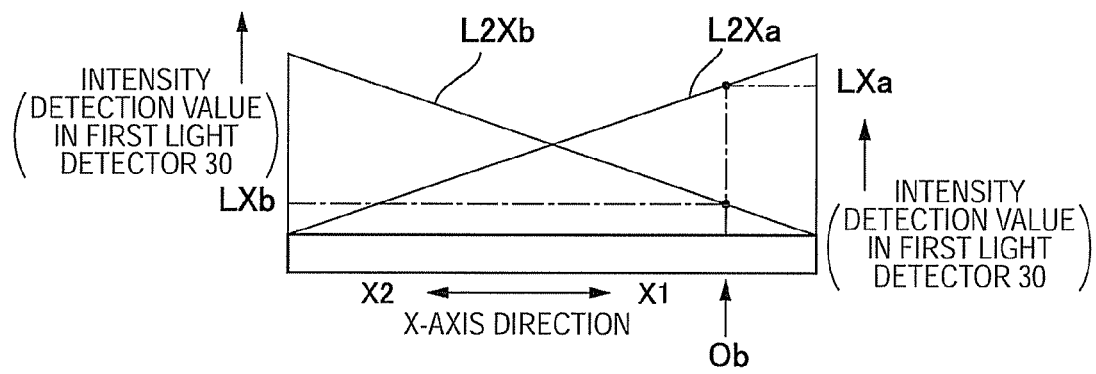
FIGS. 4A and 4B are explanatory diagrams showing the principle of X-coordinate detection used in the optical position detection device according to the first embodiment of the invention.
Figure 4B:
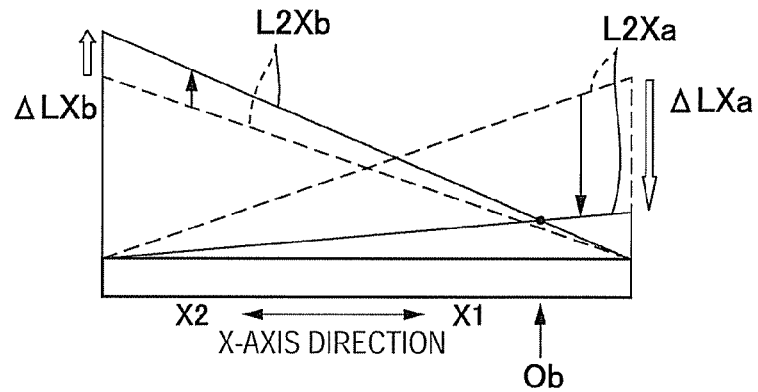

FIGS. 4A and 4B are explanatory diagrams showing the principle of the X-coordinate detection used in the optical position detection device according to the first embodiment of the invention, wherein FIG. 4A is an explanatory diagram showing the light intensity distributions in the X-axis direction of the detection light beams and so on, and FIG. 4B is an explanatory diagram showing how the light intensity distributions of the detection light beams are adjusted so that the intensities of the detection light beams reflected by the target object Ob become equal to each other.

In the optical position detection device 10 according to the present embodiment, when detecting the X-coordinate, firstly in the X-coordinate detecting first period, the light emitting element 12A is put on while putting off the light emitting element 12B to thereby form an X-coordinate detecting first light intensity distribution L2Xa in which the intensity monotonically decrease in the X-axis direction from the one side X1 toward the other side X2 as shown in FIG. 4A. Further, in an X-coordinate detecting second period, the light emitting element 12B is put on while putting off the light emitting element 12A to thereby form the X-coordinate detecting second light intensity distribution L2Xb in which the intensity monotonically decreases in the X-axis direction from the other side X2 toward the one side X1. Preferably, after forming the X-coordinate detecting first light intensity distribution L2Xa in which the intensity linearly decreases in the X-axis direction from the one side X1 toward the other side X2 in the X-coordinate detecting first period, the X-coordinate detecting second light intensity distribution L2Xb in which the intensity linearly decreases in the X-axis direction from the other side X2 toward the one side X1 is formed in the X-coordinate detecting second period.

Therefore, when the target object Ob is disposed in the detection area 10R, the detection light beams L2 are reflected by the target object Ob, and some of each of the reflected light beams is detected by the first light detector 30. Here, by previously setting the X-coordinate detecting first light intensity distribution L2Xa formed in the X-coordinate detecting first period and the X-coordinate detecting second light intensity distribution L2Xb formed in the X-coordinate detecting second period to be predetermined distributions, the X-coordinate detection section 51 can detect the X-coordinate of the target object Ob based on the detection result in the light detector 30 using the following method, for example.

For example, in a first method, a comparison result between the X-coordinate detecting first light intensity distribution L2Xa and the X-coordinate detecting second light intensity distribution L2Xb shown in FIG. 4A is used. More specifically, since the X-coordinate detecting first light intensity distribution L2Xa and the X-coordinate detecting second light intensity distribution L2Xb are previously set to the predetermined distributions, the difference between the X-coordinate detecting first light intensity distribution L2Xa and the X-coordinate detecting second light intensity distribution L2Xb is also set previously to be a predetermined function. Therefore, by comparing the detection value LXa in the first light detector 30 when forming the X-coordinate detecting first light intensity distribution L2Xa in the X-coordinate detecting first period and the detection value LXb in the first light detector 30 when forming the X-coordinate detecting second light intensity distribution L2Xb in the X-coordinate detecting second period with each other, and then obtaining the difference between the two detection values, the X-coordinate of the target object Ob can be detected.

According to such a method, even in the case in which the environment light Lc other than the detection light beams L2 such as the infrared component included in the outside light enters the first light detector 30, the intensity of the infrared component included in the environment light Lc is canceled out when obtaining the difference between the detection values LXa, LXb, and therefore, the infrared component included in the environment light Lc never exerts an influence on the detection accuracy. Further, since the blank light beams L0 (the blank light beams L0a, L0b) are not included in the detection values LXa, LXb in the first light detector 30, the X-coordinate detection section 51 can detect the X-coordinate of the target object Ob based on the detection result in the first light detector 30 without being affected by the blank light beams L0 (the blank light beams L0a, L0b). It should be noted that it is also possible to detect the X-coordinate of the target object Ob based on the ratio between the detection values LXa, LXb.

Then, in a second method, the X-coordinate of the target object Ob is detected based on the adjustment value having been used when adjusting the control value (the drive current value) for the light emitting elements 12 so that the detection value LXa in the first light detector 30 when forming the X-coordinate detecting first light intensity distribution L2Xa in the X-coordinate detecting first period and the detection value LXb in the first light detector 30 when forming the X-coordinate detecting second light intensity distribution L2Xb in the X-coordinate detecting second period become equal to each other. Such a method can be applied to the case in which the intensity in the X-coordinate detecting first light intensity distribution L2Xa and the X-coordinate detecting second light intensity distribution L2Xb shown in FIG. 4A varies linearly with respect to the X-coordinate. In the present embodiment, the detection light beam Lb out of the detection light beam La emitted by the light emitting element 12A and the detection light beam Lb emitted by the light emitting element 12B is used as the reference light beam in the first period, and the detection light beam La is used as the reference light beam in the second period, and the differential between the detection light beam and the reference light beam is used.

Firstly, as shown in FIG. 4A, the X-coordinate detecting first light intensity distribution L2Xa and the X-coordinate detecting second light intensity distribution L2Xb are formed in the X-coordinate detecting first period and the X-coordinate detecting second period so that the absolute values are equal to each other and the directions are opposite to each other along the X-axis direction. It is understood that if the detection value LXa in the first light detector 30 in the X-coordinate detecting first period and the detection value LXb in the first light detector 30 in the X-coordinate detecting second period are equal to each other, the target object Ob is located at the center in the X-axis direction.

In contrast thereto, in the case in which the detection value LXa in the first light detector 30 in the X-coordinate detecting first period and the detection value LXb in the first light detector 30 in the X-coordinate detecting second period are different from each other, the control values (the drive current values) to the light emitting elements 12 are adjusted so that the detection values LXa, LXb become equal to each other, and as shown in FIG. 4B, the X-coordinate detecting first light intensity distribution L2Xa is formed again in the X-coordinate detecting first period, and the X-coordinate detecting second light intensity distribution L2Xb is formed again in the X-coordinate detecting second period. As a result, if the detection value LXa in the first light detector 30 in the X-coordinate detecting first period and the detection value LXb in the first light detector 30 in the X-coordinate detecting second period become equal to each other, the X-coordinate of the target object Ob can be detected based on the ratio, the difference, or the like between the adjustment value ΔLXa of the control value to the light emitting elements 12 in the X-coordinate detecting first period and the adjustment value ΔLXb of the control value to the light emitting elements 12 in the X-coordinate detecting second period.

According to such a method, even in the case in which the environment light Lc other than the detection light beams L2 such as the infrared component included in the outside light enters the first light detector 30, the intensity of the infrared component included in the environment light Lc is canceled out when performing adjustment of the control values to the light emitting elements 12 so that the detection values LXa, LXb become equal to each other, and therefore, the infrared component included in the environment light Lc never exerts an influence on the detection accuracy. Further, since the blank light beams L0 (the blank light beams L0a, L0b) are not included in the detection values LXa, LXb in the first light detector 30, the X-coordinate detection section 51 can detect the X-coordinate of the target object Ob based on the detection result in the first light detector 30 without being affected by the blank light beams L0 (the blank light beams L0a, L0b).

It should be noted that although in the method described above both of the control values to the light emitting elements 12A, 12B for position detection are adjusted, it is also possible to adjust either one of the control values.

Further, although in the method described above the X-coordinate of the target object Ob is detected based on the control values to the light emitting elements 12A, 12B for position detection, it is also possible to detect the X-coordinate of the target object Ob based on the light reception result in the second light detector 60 when controlling the light emitting elements 12A, 12B so that the detection values LXa, LXb become equal to each other.

When obtaining the position information of the target object Ob in the X-axis direction based on the detection result in the light detector 30 in such a manner as described above, it is also possible to adopt a configuration of using a microprocessor unit (MPU) as the position detection section 50, and thus executing predetermined software (an operation program) by the microprocessor unit, thereby performing the process. Further, as explained later with reference to FIGS. 5A and 5B, it is also possible to adopt a configuration of performing the process with a signal processing section using hardware such as a logic circuit.

Configuration Example of Position Detection Section 50

Figure 5A:
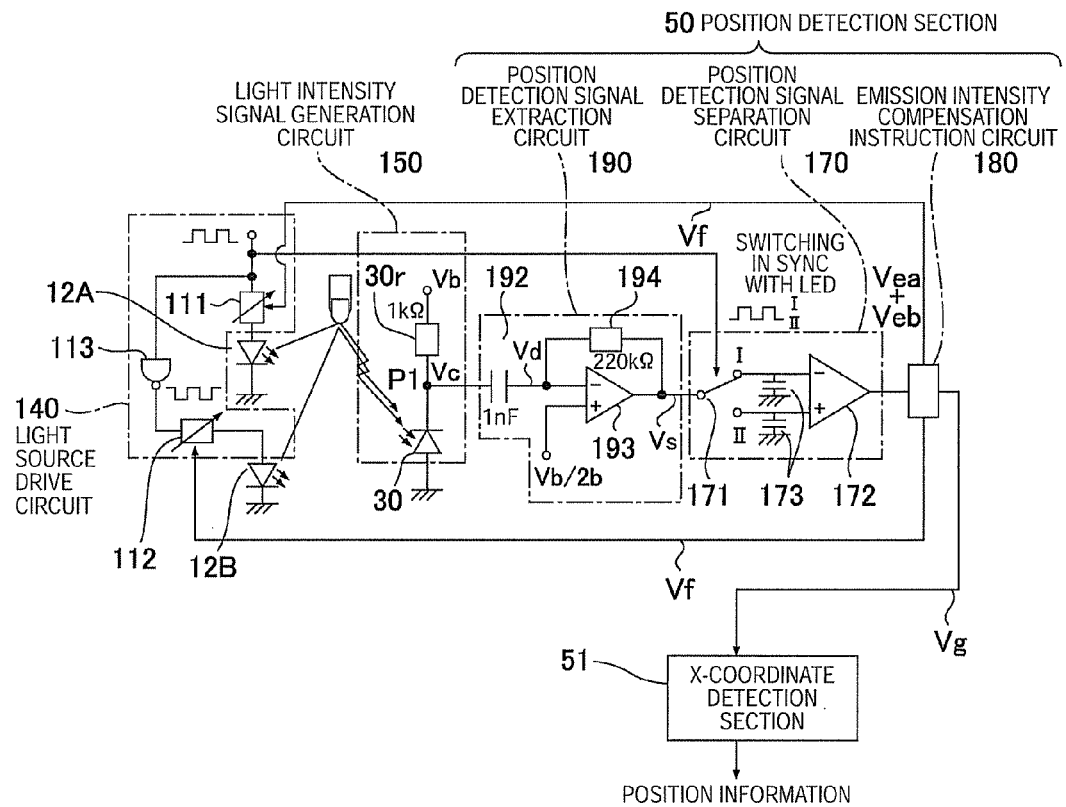
FIGS. 5A and 5B are explanatory diagrams showing the content of the signal processing in the optical position detection device according to the first embodiment of the invention.
Figure 5B:
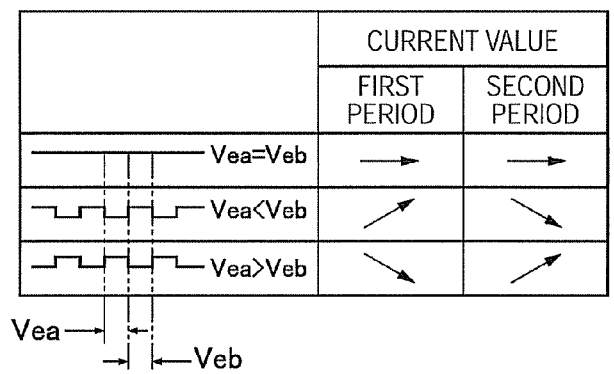

FIGS. 5A and 5B are explanatory diagrams showing the content of the signal processing in the optical position detection device 10 according to the first embodiment of the invention, wherein FIG. 5A is an explanatory diagram of the position detection section 50 of the optical position detection device 10 according to the first embodiment of the invention, and FIG. 5B is an explanatory diagram showing the content of the process in an emission intensity compensation instruction section of the position detection section 50. The position detection section 50 described here adopts the method of detecting the distance LZ (a Z-coordinate) between the target object Ob and the first surface 41 of the transmissive member 40 based on the adjustment values when adjusting the control value (the drive current value) to the light emitting elements 12A, 12B for position detection and the control value (the drive current value) to the light emitting element 12R for reference so that the detection value LXa of the detection light beam L2a in the first light detector 30 and the detection value LXb of the detection light beam L2b in the first light detector 30 become equal to each other.

As shown in FIG. 5A, in the optical position detection device 10 according to the present embodiment, the light source drive circuit 140 is represented as being arranged to apply a drive pulse with a predetermined current value to the light emitting element 12A for position detection via a variable resistor 111 in the X-coordinate detecting first period, and apply a drive pulse with a predetermined current value to the light emitting element 12B for position detection via a variable resistor 112 and an inverting circuit 113 in the X-coordinate detecting second period. Therefore, as a result, the light source drive circuit 140 applies the drive pulses with phases reverse to each other to the light emitting elements 12A, 12B in the X-coordinate detecting first period and the X-coordinate detecting second period, respectively. Further, the light beam, which is the first position detection light beam L2a forming the X-coordinate detecting first light intensity distribution L2Xa and reflected by the target object Ob, is received by the common first light detector 30 in the X-coordinate detecting first period, and the light beam, which is the second position detection light beam L2b forming the X-coordinate detecting second light intensity distribution L2Xb and reflected by the target object Ob, is received by the common first light detector 30 in the X-coordinate detecting second period. In a light intensity signal generation circuit 150, a resistor 30r with a resistance of about 1 kΩ is connected in series to the first light detector 30, and a bias voltage Vb is applied between the both ends thereof.

In such a light intensity signal generation circuit 150, the position detection section 50 is electrically connected to the connection point P1 between the first light detector 30 and the resistor 30r. A detection signal Vc output from the connection point P1 between the first light detector 30 and the resistor 30r is expressed by the following formula.

$$Vc = V30/(V30 + (\text{resistance value of the resistor } 30r))$$

V30: an equivalent resistance of the first light detector 30

Therefore, in comparison between the case in which the environment light Lc fails to enter the first light detector 30 and the case in which the environment light Lc enters the first light detector 30, the level and the amplitude of the detection signal Vc become greater in the case in which the environment light Lc enters the first light detector 30.

The position detection section 50 is generally composed of a position detection signal extraction circuit 190, a position detection signal separation circuit 170, and the emission intensity compensation instruction circuit 180.

The position detection signal extraction circuit 190 is provided with a filter 192 composed of a capacitor of about 1 nF, and the filter 192 functions as a high-pass filter for eliminating a direct-current component from the signal output from the connection point P1 between the first light detector 30 and the resistor 30r. Therefore, due to the filter 192, only the position detection signal Vd detected by the first light detector 30 in the X-coordinate detecting first period and the X-coordinate detecting second period is extracted from the detection signal Vc output from the connection point P1 between the first light detector 30 and the resistor 30r. Therefore, since the intensity of the environment light Lc can be regarded as constant during a certain period of time while the detection light beams L2 and the reference light beam L2r are modulated, the low-frequency component or the direct-current component caused by the environment light Lc can be eliminated by the filter 192.

Further, the position detection signal extraction circuit 190 has an adder circuit 193 provided with a feedback resistor 194 of about 220 kΩ in the posterior stage of the filter 192, and the position detection signal Vd extracted by the filter 192 is output to the position detection signal separation circuit 170 as a position detection signal Vs obtained by superimposing the position detection signal Vd on a voltage V/2 half as high as the bias voltage Vb.

The position detection signal separation circuit 170 is provided with a switch 171 for performing a switching operation in sync with the drive pulse applied to the light emitting element 12A in the X-coordinate detecting first period, a comparator 172, and capacitors 173 electrically connected respectively to input lines of the comparator 172. Therefore, when the position detection signal Vs is input to the position detection signal separation circuit 170, the position detection signal separation circuit 170 outputs the effective value Vea of the position detection signal Vs in the X-coordinate detecting first period and the effective value Veb of the position detection signal Vs in the X-coordinate detecting second period alternately to the emission intensity compensation instruction circuit 180.

The emission intensity compensation instruction circuit 180 compares the effective values Vea, Veb with each other to perform the process shown in FIG. 5B, and outputs the control signal Vf to the light source drive circuit 140 so that the effective value Vea of the position detection signal Vs in the X-coordinate detecting first period and the effective value Veb of the position detection signal Vs in the X-coordinate detecting second period have the same level. In other words, the emission intensity compensation instruction circuit 180 compares the effective value Vea of the position detection signal Vs in the X-coordinate detecting first period and the effective value Veb of the position detection signal Vs in the X-coordinate detecting second period with each other, and then keeps the present drive condition if they are equal to each other. In contrast thereto, if the effective value Vea of the position detection signal Vs in the X-coordinate detecting first period is lower than the effective value Veb of the position detection signal Vs in the X-coordinate detecting second period, the emission intensity compensation instruction circuit 180 makes the resistance value of the variable resistor 111 decrease to thereby increase the intensity of the light emitted from the light emitting element 12 in the X-coordinate detecting first period. Further, if the effective value Veb of the position detection signal Vs in the X-coordinate detecting second period is lower than the effective value Vea of the position detection signal Vs in the X-coordinate detecting first period, the emission intensity compensation instruction circuit 180 makes the resistance value of the variable resistor 112 decrease to thereby increase the intensity of the emission light in the X-coordinate detecting second period.

In such a manner as described above, the optical position detection device 10 controls the control value (the current value) of each of the light emitting elements 12 using the emission intensity compensation instruction circuit 180 of the position detection section 50 so that the detection amounts by the first light detector 30 in the X-coordinate detecting first period and the X-coordinate detecting second period become equal to each other. Therefore, since the information regarding the control values to the light emitting elements 12, with which the effective value Vea of the position detection signal Vs in the X-coordinate detecting first period and the effective value Veb of the position detection signal Vs in the X-coordinate detecting second period have the same level, exists in the emission intensity compensation instruction circuit 180, by outputting the information to the distance detection section 53 as the position detection signal Vg, the distance detection section 53 can obtain the X-coordinate of the target object Ob.

Further, in the present embodiment, the filter 192 eliminates the direct-current component caused by the environment light Lc from the detection signal Vc output from the connection point P1 between the first light detector 30 and the resistor 30r to thereby extract the position detection signal Vd in the position detection signal extraction circuit 190. Therefore, even in the case in which the detection signal Vc output from the connection point P1 between the first light detector 30 and the resistor 30r includes the signal component due to the infrared component of the environment light Lc, the influence of such environment light Lc can be canceled.

Distance Detecting Light Intensity Distribution and Method of Detecting Distance LZ FIGS. 6A and 6B are explanatory diagrams showing the principle of detecting the distance between the transmissive member and the target object in the optical position detection device according to the first embodiment of the invention, wherein FIG. 6A is an explanatory diagram showing the light intensity distribution of the detection light beam in the Z-axis direction, and FIG. 6B is an explanatory diagram showing how the light intensity distribution of the detection light beam in the Z-axis direction is adjusted so that the intensities of the detection light beams reflected by the target object Ob become equal to each other.

In the optical position detection device 10 according to the present embodiment, when the light emitting elements 12A, 12B are put on simultaneously in the detection light beam detection period, the distance detecting light intensity distribution L2Zab (the Z-coordinate detecting light intensity distribution) in which the intensity decreases monotonically along the normal direction with respect to the first surface 41 is formed on the side (the detection area 10R) of the first surface 41 of the transmissive member 40 as shown in FIG. 6A. In the present embodiment, in the distance detecting light intensity distribution L2Zab, the intensity decreases linearly as the distance from the first surface 41 of the transmissive member 40 increases, and in the X-axis direction, the intensity of the detection light beam L2 is constant. Therefore, if the target object Ob is disposed in the detection area 10R in the detection light beam detection period in the condition of putting on the light emitting elements 12A, 12B while putting off the light emitting element 12R for reference, the detection light beams L2 (the detection light beams L2a, L2b) are reflected by the target object Ob, and some of the position detecting reflected light beam L3 is detected by the first light detector 30. Here, the light reception intensity of the detection light beams L2 (the detection light beams L2a, L2b) in the first light detector 30 has a certain relationship, for example, a proportional relationship, with the intensity corresponding to the position of the target object Ob in the distance detecting light intensity distribution L2Zab.

In contrast thereto, when the light emitting element 12R for reference is put on in the reference light detection period, the reference light beam L2r emitted from the light emitting element 12R is partially detected by the first light detector 30.

Here, since the reference light beam L2r is never reflected by the target object Ob, the light reception intensity Lr of the reference light beam L2r in the first light detector 30 is constant irrespective of the position of the target object Ob as shown in FIG. 6A.

In the example shown in FIGS. 6A and 6B, the detection intensity of the reference light beam L2r in the first light detector 30 is made equal to the intensity obtained when the first light detector 30 detects the detection light beams L2 (the detection light beams L2a, L2b) when the target object Ob is located at a position immediately before having contact with the first surface 41.

By using such a distance detecting light intensity distribution L2Zab and the reference light beam L2r, the distance LZ (the Z-coordinate) between the target object Ob and the transmissive member 40 can be detected using the methods explained as follows.

For example, in a first method, a difference between the distance detecting light intensity distribution L2Zab and the light reception intensity Lr of the reference light beam L2r in the first light detector 30 shown in FIG. 6A are used. More specifically, since the distance detecting light intensity distribution L2Zab is previously set to a predetermined distribution, the difference between the distance detecting light intensity distribution L2Zab and the intensity of the reference light beam L2r in the first light detector 30 is previously set to a predetermined function. Therefore, the distance detection section 53 can detect the distance LZ (the Z-coordinate) between the target object Ob and the first surface 41 of the transmissive member 40 by obtaining the difference between the detection value LZab in the first light detector when forming the distance detecting light intensity distribution L2Zab in the detection light beam detection period and the detection value Lr in the first light detector 30 when emitting the reference light beam L2r in the reference light beam detection period.

According to such a method, even in the case in which the environment light Lc other than the detection light beams L2 such as the infrared component included in the outside light enters the first light detector 30, the intensity of the infrared component included in the environment light Lc is canceled out when obtaining the difference between the detection values LZab, Lr, and therefore, the infrared component included in the environment light Lc never exerts an influence on the detection accuracy. Further, since the blank light beams L0 (the blank light beams L0a, L0b, L0r) are not included in the detection values LZab, LZr in the first light detector 30, the distance detection section 53 can detect the distance (the Z-coordinate) of the target object Ob based on the detection result in the first light detector 30 without being affected by the blank light beams L0 (the blank light beams L0a, L0b, L0r). It should be noted that it is also possible to detect the Z-coordinate of the target object Ob based on the ratio, the difference, or the ratio and the difference between the detection value obtained when putting on the light emitting element 12A, the detection value obtained when putting on the light emitting element 12B, and the detection value Lr obtained when putting on the light emitting element 12R.

Then as a second method there is adopted the method of detecting the distance LZ (the Z-coordinate) between the target object Ob and the first surface 41 of the transmissive member 40 based on the adjustment values when adjusting the control values (the drive current values) to the light emitting elements 12A, 12B for position detection and the control value (the drive current value) to the light emitting element 12R for reference so that the detection value LZab in the first light detector 30 in the detection light beam detection period and the detection value Lr in the first light detector 30 in the reference light beam detection period become equal to each other.

In such a method, firstly, as shown in FIG. 6A, in the detection light beam detection period, the light emitting elements 12A, 12B for position detection are put on while putting off the light emitting element 12R for reference to thereby obtain the detection value LZab in the first light detector 30 when forming the distance detecting light intensity distribution L2Zab. Subsequently, in the reference light beam detection period, the detection value Lr in the first light detector 30 when the light emitting elements 12A, 12B for position detection are put off while putting on the light emitting element 12R for reference is obtained. On this occasion, if the detection value LZab in the first light detector 30 when forming the distance detecting light intensity distribution L2Zab and the detection value Lr of the reference light beam L2r in the first light detector 30 are equal to each other, it is understood that the target object Ob is located at the position immediately before having contact with the first surface 41.

In contrast thereto, if the detection value LZab in the first light detector 30 when forming the distance detecting light intensity distribution L2Zab and the detection value Lr of the reference light beam L2r in the first light detector 30 are different from each other, the control values (the drive current values) to the light emitting elements 12A, 12B for position detection and the control value (the drive current value) to the light emitting element 12R for reference are adjusted so that the detection values LZab, Lr become equal to each other. Then, as shown in FIG. 6B, the detection value LZab in the first light detector 30 when forming the distance detecting light intensity distribution L2Zab is obtained again in the detection light beam detection period, and the detection value Lr of the reference light beam L2r in the first light detector 30 is obtained again in the reference light beam detection period.

As a result, if the detection value LZab in the first light detector 30 obtained when forming the distance detecting light intensity distribution L2Zab and the detection value Lr of the reference light beam L2r in the first light detector 30 become the value LZabr, namely equal to each other, the distance detection section 53 can detect the distance LZ (the Z-coordinate) between the target object Ob and the first surface 41 of the transmissive member 40 based on the ratio or the difference between the adjustment value $\Delta L2Zab$ of the control values to the light emitting elements 12A, 12B for position detection and the adjustment value $\Delta L2r$ of the control value to the light emitting element 12R for reference.

According to such a method, even in the case in which the environment light Lc other than the detection light beams L2 such as the infrared component included in the outside light enters the first light detector 30, the intensity of the infrared component included in the environment light Lc is canceled out when performing adjustment of the control values to the light emitting elements 12A, 12B for position detection and the light emitting element 12R for reference so that the detection values LZab, Lr become equal to each other, and therefore, the infrared component included in the environment light Lc never exerts an influence on the detection accuracy. Further, since the blank light beams L0 (the blank light beams L0a, L0b, L0r) are not included in the detection values LZab, LZr in the first light detector 30, the distance detection section 53 can detect the distance (the Z-coordinate) of the target object Ob based on the detection result in the first light detector 30 without being affected by the blank light beams L0 (the blank light beams L0a, L0b, L0r).

It should be noted that although in the method described above the distance LZ (the Z-coordinate) between the target object Ob and the transmissive member 40 is detected based on the control values to the light emitting elements 12A, 12B for position detection and the control value to the light emitting element 12R for reference, it is also possible to detect the distance LZ (the Z-coordinate) between the target object Ob and the transmissive member 40 based on the light reception result in the second light detector 60 when controlling the light emitting elements 12A, 12B, and 12R so that the detection values LZab, Lr become equal to each other.

It should be noted that although in the method described above both of the control values to the light emitting elements 12A, 12B for position detection, and the control value to the light emitting element 12R for reference are adjusted, it is also possible to adjust either one of the control values.

When obtaining the position information of the target object Ob in the Z-axis direction based on the detection result in the first light detector 30 as described above, it is also possible to adopt a configuration of, for example, using a microprocessor unit (MPU) as the position detection section 50, and thus executing predetermined software (an operation program) by the microprocessor unit, thereby performing the process. Further, as explained with reference to FIGS. 5A and 5B, it is also possible to adopt a configuration of performing the process with a signal processing section using hardware such as a logic circuit.

Major Advantages of Present Embodiment

As explained hereinabove, in the optical position detection device 10 according to the present embodiment, the light source section 11 emits the detection light beams L2 to form the light intensity distribution in the detection area 10R. Further, the position detecting reflected light beams L3 reflected by the target object Ob are detected by the first light detector 30. Here, since the light intensity distribution has a certain relationship between the position in the detection area 10R and the intensity, by previously figuring out the relationship between the position and the intensity of the detection light beam, the position detection section 50 can detect the position of the target object based on the light reception result of the first light detector 30.

Further, in the present embodiment, there is provided the second light detector 60 to which the position detecting reflected light beams L3 reflected by the target object Ob in the detection area 10R out of the detection light beams L2 emitted from the light source section 11 are not input, and the blank light beams L0 not passing through the detection area 10R enter the second light detector 60. Therefore, since the second light detector 60 can monitor the blank light beams L0 irrespective of whether or not the target object Ob exists in the detection area 10R, it is possible to set the emission intensities of the detection light beams L2 from the light source section 11 to optimum conditions based on the monitoring result. Therefore, since it is not required to monitor the blank light beams L0 by the first light detector 30, it is possible to adopt the configuration in which the position detecting reflected light beams L3 enter the first light detector 30 while the blank light beams L0 do not enter the first light detector 30. Therefore, since the influence of the blank light beams L0 is eliminated from the light reception result in the first light detector 30, the position detection section 50 can detect the position of the target object Ob without being unnecessarily affected by the blank light beams L0.

Further, in the present embodiment, between the second light detector 60 and the detection area 10R, there is disposed the light blocking member 70 for preventing the position detecting reflected light beams L3 reflected by the target object Ob from entering the second light detector 60. Therefore, the position detecting reflected light beams L3 can be prevented from entering the second light detector 60 only by adding the configuration of providing the light blocking member 70.

Further, in the present embodiment, the transmissive member 40 is disposed between the light source section 11 and the detection area 10R, and the blank light beams L0 are the light beams reflected by the second surface 42 of the transmissive member 40 out of the detection light beams L2 emitted from the light source section 11. Therefore, out of the detection light beams L2 emitted from the light source section 11, the blank light beams L0 can be deflected toward the side on which the second light detector 60 is located.

Further, since the first light detector 30 has the light receiving section 31 located close to the second surface 42 of the transmissive member 40, the blank light beams L0 can be prevented from entering the first light detector 30 with a relatively simple configuration. Further, the second light detector 60 is disposed at a position overlapping the first light detector 30 in the normal direction with respect to the second surface 42 on the side opposite to the side on which the transmissive member 40 is located with respect to the first light detector 30. Therefore, the position detecting reflected light beams L3 can be prevented from entering the second light detector 60 with the relatively simple configuration of disposing the light blocking member 70 between the first light detector 30 and the second light detector 60.

Further, in the optical position detection device 10 according to the present embodiment, since the light sources (the light emitting elements 12) of the light source sections 11 are light emitting diodes, the light source section 11 can be configured to have a small size at a moderate price. Further, since the first light detector 30 and the second light detector 60 are each composed of the light receiving elements such as a photodiode or a phototransistor, the first light detector 30 and the second light detector 60 can be configured to have a small size at a moderate price.

Second Embodiment

As the first embodiment an example of detecting the distance LZ of the target object Ob from the transmissive member 40 and the X-coordinate of the target object Ob using the first light detector 30 is explained. The example of detecting the Y-coordinate of the target object Ob will further be explained with reference to FIGS. 7A, 7B, 8, 9A through 9D, and 10A through 10D.

Overall Configuration

Figure 7A:
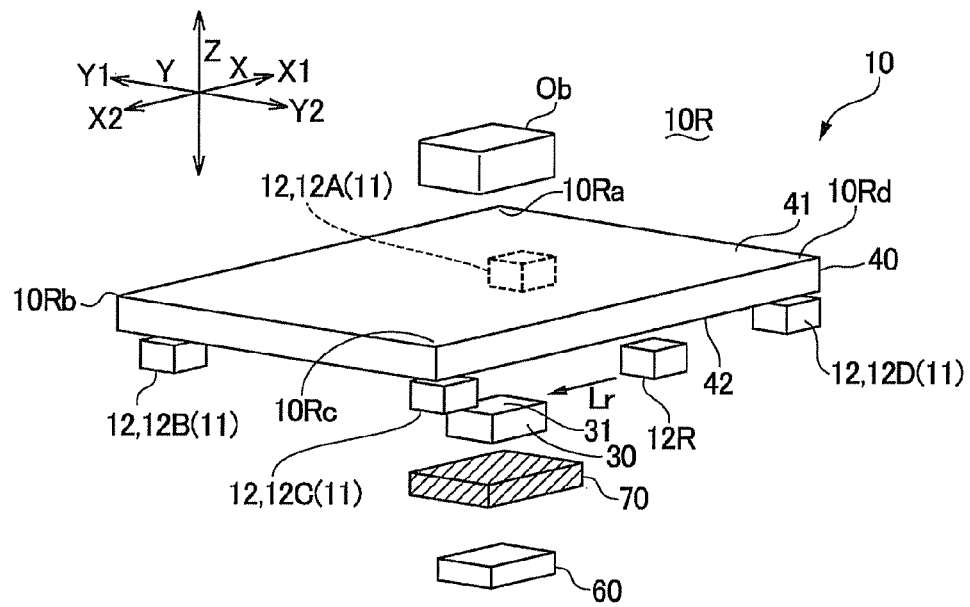
FIGS. 7A and 7B are explanatory diagrams schematically showing a principal part of an optical position detection device according to a second embodiment of the invention.
Figure 7B:
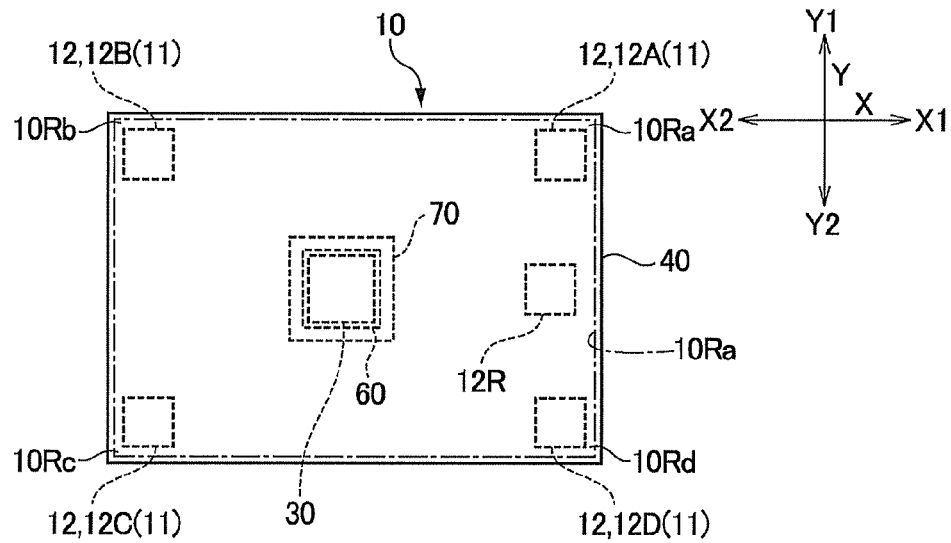
Figure 8:
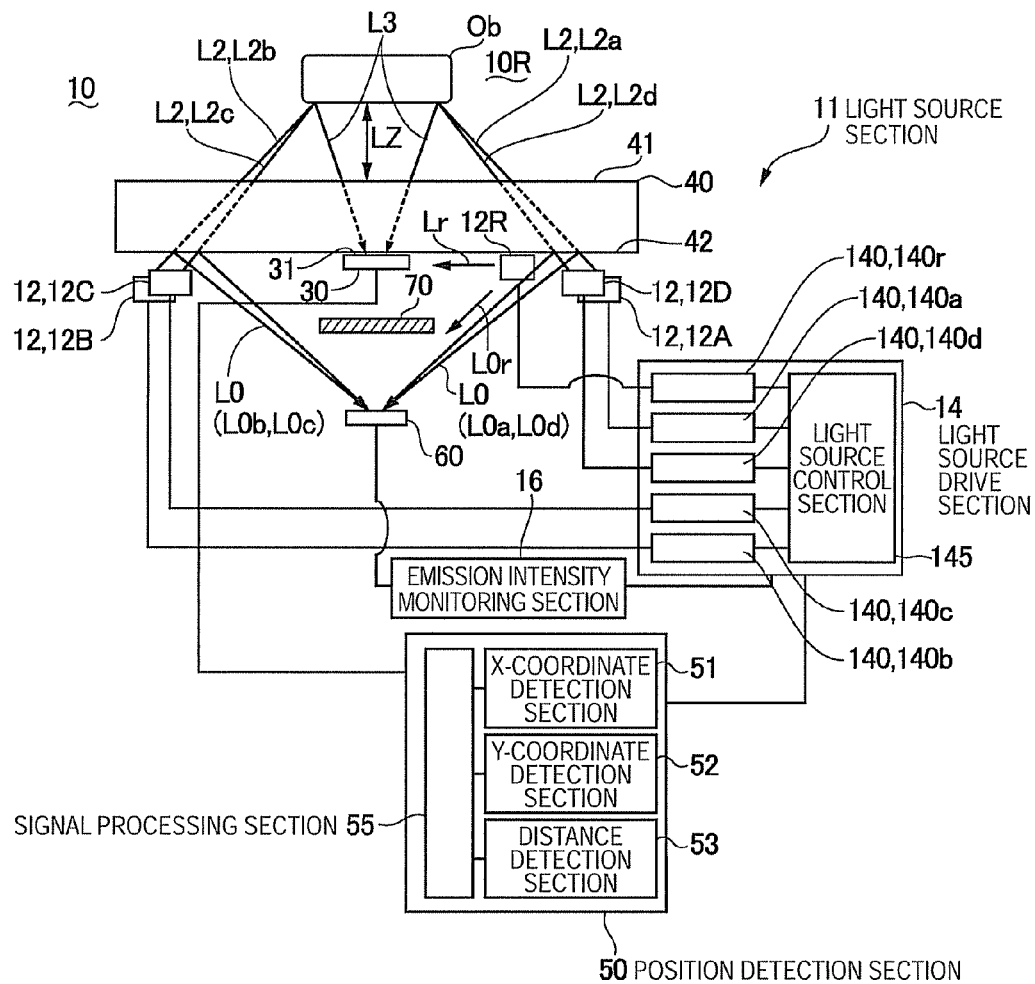
FIG. 8 is an explanatory diagram showing an overall configuration of the optical position detection device according to the second embodiment of the invention.

FIGS. 7A and 7B are explanatory diagrams of a principal part of the optical position detection device according to a second embodiment of the invention, wherein FIG. 7A is an explanatory diagram showing a three-dimensional arrangement of constituents of the optical position detection device, and FIG. 7B is an explanatory diagram showing a two-dimensional arrangement of the constituents of the optical position detection device. FIG. 8 is an explanatory diagram showing an overall configuration of the optical position detection device according to the second embodiment of the invention. It should be noted that since the basic configuration of the present embodiment is substantially the same as in the first embodiment, common parts are denoted with the same reference symbols and the detailed explanation therefor will be omitted.

In FIGS. 7A, 7B, and 8, similarly to the case of the first embodiment, the optical position detection device 10 according to the present embodiment is also an optical sensor device for detecting the position of the target object Ob located on the side of a first surface 41 of the transmissive member 40 having a sheet-like shape or a plate-like shape, and is used as a tactile sensor of a robot hand device described later or a touch panel.

In order for performing such detection, the optical position detection device 10 according to the present embodiment is provided with the transmissive member 40 having a sheet-like shape or a plate-like shape and having a first surface directed along the XY plane, a light source section 11 for emitting detection light beams L2 from the side of the second surface opposite to the side of the first surface 41 in the transmissive member 40, and the first light detector 30 for detecting position detecting reflected light beams L3 reflected by the target object Ob and transmitted to the side of the second surface 42 of the transmissive member 40.

In the present embodiment, the light source section 11 is provided with four light emitting elements 12 (12A through 12D) for position detection, and the four light emitting elements 12A through 12D are located at respective positions distant from each other in both of the X-axis direction and the Y-axis direction, and have the respective light emitting surfaces directed toward the transmissive member 40. The light emitting elements 12A through 12D are each composed of a light emitting diode (LED) or the like, and in the present embodiment, the light emitting elements 12A through 12D respectively emit the detection light beams L2a through L2d, which are infrared light beams, as diverging light beams.

The first light detector 30 is a photodiode having the light receiving section 31 directed toward the transmissive member 40 and is disposed on the side of the second surface 42 of the transmissive member 40, and between the positions at which the two light emitting elements 12A, 12B are respectively disposed. The first light detector 30 is located on the side of the second surface 42 of the transmissive member 40 and has the light receiving section 31 directed toward the second surface 42, and the light receiving section 31 is disposed close to the second surface 42.

Further, in the optical position detection device 10 according to the present embodiment, on the side of the second surface 42 of the transmissive member 40 there is disposed a second light detector 60, and the second light detector 60 also has a light receiving section 61 directed toward the second surface 42 similarly to the first light detector 30. Similarly to the first light detector 30, the second light detector 60 is composed of a photodiode or a phototransistor, and in the present embodiment, a photodiode is used as the second light detector 60.

Here, the second light detector 60 is disposed at a position overlapping the first light detector 30 in the normal direction with respect to the second surface 42 on the side opposite to the side on which the transmissive member 40 is located with respect to the first light detector 30. Further, in a space between the first light detector 30 and the second light detector 60 included in a space between the transmissive member 40 and the second light detector 60, there is disposed a plate-like light blocking member 70, and therefore the light blocking member 70 intervenes between the detection area 10R and the second light detector 60.

Similarly to the case of the first embodiment, also in the optical position detection device 10 thus configured, since the light receiving section 31 of the first light detector 30 is opposed to the second surface 42, the position detecting reflected light beams L3 reflected by the target object Ob in the detection area 10R enter the first light detector 30. It should be noted that since the light receiving section 31 of the first light detector 30 is close to the second surface 42, the blank light beams L0 (the blank light beams L0a, L0b, L0c, and L0d), which are reflected by the second surface 42 of the transmissive member 40 and fail to reach the detection area 10R, fail to enter the first light detector 30. In contrast thereto, since the first light detector 30 and the light blocking member 70 intervene between the second light detector 60, and the transmissive member 40 and the detection area 10R, the position detecting reflected light beams L3 reflected by the target object Ob in the detection area 10R fail to enter the second light detector 60. It should be noted that since the light blocking member 70 is fairly small in view of the size of the transmissive member 40 and the distance between the light emitting elements 12, the blank light beams L0, which are reflected by the second surface 42 of the transmissive member 40 and fail to reach the detection area 10R, enter the second light detector 60.

It should be noted that in the present embodiment, environment light Lc such as outside light enters both of the first light detector 30 and the second light detector 60. Further, the reference light beam L2r emitted from the light emitting element 12R for reference partially enters the first light detector 30, and partially enters the second light detector 60 as the blank light beam L0r.

In the present embodiment, the light source drive section 14 shown in FIG. 8 is provided with the light source drive circuit 140 for driving the light emitting elements 12, and the light source control section 145 for controlling lighting pattern of each of the light emitting elements 12 (the light emitting elements 12A through 12D) for position detection and the light emitting element 12R for reference via the light source drive circuit 140. The light source drive circuit 140 is composed of light source drive circuits 140a through 140d, and 140r for respectively driving the five light emitting elements 12A through 12D, and 12R, and the light source control section 145 controls all of the light source drive circuits 140a through 140d, and 140r.

The position detection section 50 is electrically connected to the first light detector 30, and the detection result in the first light detector 30 is output to the position detection section 50. In the present embodiment, the position detection section 50 is provided with a signal processing section 55 provided with an amplifier and so on, an X-coordinate detection section 51, a Y-coordinate detection section 52, and a distance detection section 53 (a Z-coordinate detection section), and the light source drive section 14 and the position detection section 50 operate in conjunction with each other to perform the position detection described later.

An emission intensity monitoring section 16 is electrically connected to the second light detector 60, and the detection result in the second light detector 60 is output to the emission intensity monitoring section 16. Such an emission intensity monitoring section 16 monitors the emission intensity of each of the light emitting elements 12 (the light emitting elements 12A through 12D) for position detection and the light emitting element 12R for reference based on the detection result of the blank light beams L0 by the second light detector 60, and the light source control section 145 sets an initial value of the emission intensity of each of the light emitting elements 12 (the light emitting elements 12A through 12D) for position detection and the light emitting element 12R for reference based on the monitoring result.

Position Detection Operation etc.

FIGS. 9A through 9D are explanatory diagrams of detection light beams emitted from the respective light emitting elements 12 in the optical position detection device 10 according to the second embodiment of the invention. FIGS. 10A through 10D are explanatory diagrams showing light intensity distributions used for coordinate detection formed by the detection light beams emitted from the light emitting elements 12 in the optical position detection device 10 according to the second embodiment of the invention.

In the optical position detection device 10 according to the present embodiment, the detection area 10R is set on the side of the first surface 41 of the transmissive member 40, and the light emitting elements 12A through 12D of the light source section 11 form the light intensity distributions explained below.

Figure 9A:
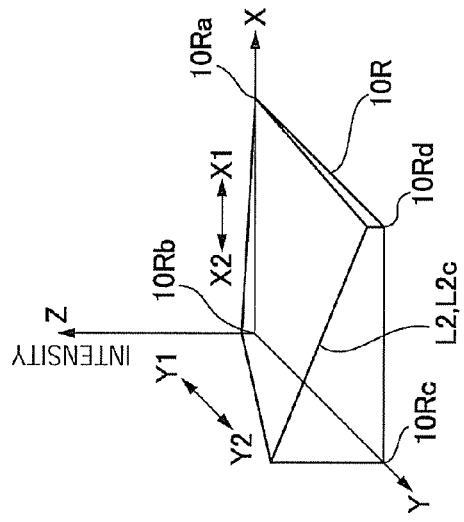
FIGS. 9A through 9D are explanatory diagrams of detection light beams emitted from respective light emitting elements in the optical position detection device according to the second embodiment of the invention.
Figure 9B:
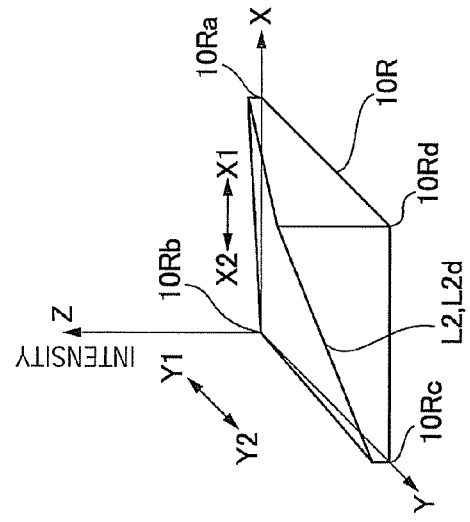
Figure 9C:
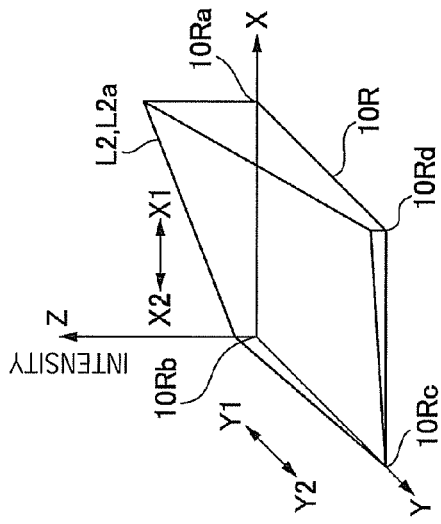
Figure 9D:
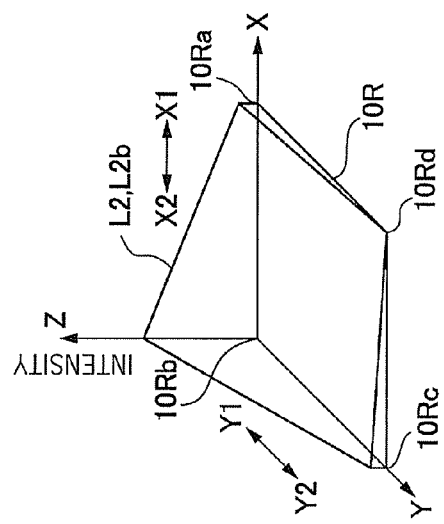

Firstly, the detection area 10R has, for example, a rectangular shape, and the four light emitting elements 12A through 12D have respective central optical axes directed toward the four corner portions 10Ra through 10Rd of the detection area 10R. Therefore, when the light emitting element 12A is put on, the light intensity distribution centering on the corner portion 10Ra of the detection area 10R is formed as shown in FIG. 9A. Further, when the light emitting element 12B is put on, the light intensity distribution centering on the corner portion 10Rb of the detection area 10R is formed as shown in FIG. 9B. When the light emitting element 12C is put on, the light intensity distribution centering on the corner portion 10Rc of the detection area 10R is formed as shown in FIG. 9C. Further, when the light emitting element 12D is put on, the light intensity distribution centering on the corner portion 10Rd of the detection area 10R is formed as shown in FIG. 9D.

Figure 10A:
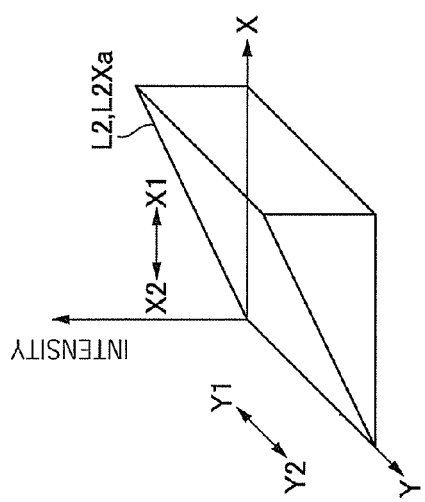
FIGS. 10A through 10D are explanatory diagrams showing light intensity distributions used for coordinate detection formed by the detection light beams emitted from the light emitting elements in the optical position detection device according to the second embodiment of the invention.
Figure 10B:
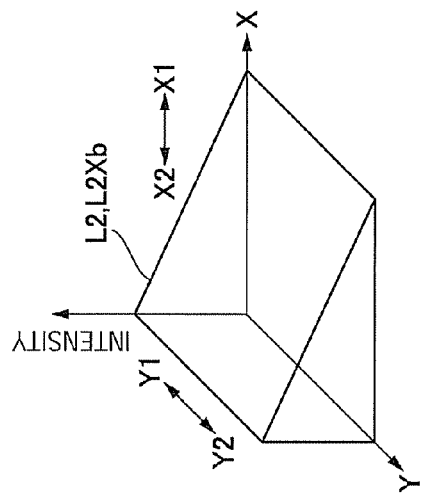

Therefore, if the light emitting elements 12A, 12D are in an on-state and the other light emitting elements 12 are in an off-state, there is formed the X-coordinate detecting first light intensity distribution L2Xa (a first coordinate detecting light intensity distribution/a first coordinate detecting first light intensity distribution) in which the intensity of the detection light beam decreases monotonically in the X-axis direction from the one side X1 to the other side X2 as shown in FIG. 10A. In the present embodiment, in the X-coordinate detecting first light intensity distribution L2Xa, the intensity of the detection light beam L2 varies linearly in the X-axis direction from the one side X1 toward the other side X2, and is constant in the Y-axis direction. In contrast thereto, if the light emitting elements 12B, 12C are in an on-state and the other light emitting elements 12 are in an off-state, there is formed the X-coordinate detecting second light intensity distribution L2Xb (a first coordinate detecting light intensity distribution/a first coordinate detecting second light intensity distribution) in which the intensity of the detection light beam decreases monotonically in the X-axis direction from the other side X2 to the one side X1 as shown in FIG. 10B. In the present embodiment, in the X-coordinate detecting second light intensity distribution L2Xb, the intensity of the detection light beam L2 varies linearly in the X-axis direction from the other side X2 toward the one side X1, and is constant in the Y-axis direction. Therefore, also in the optical position detection device 10 according to the present embodiment, the X-coordinate detection section 51 can detect the X-coordinate of the target object Ob similarly to the case of the first embodiment.

Figure 10C:
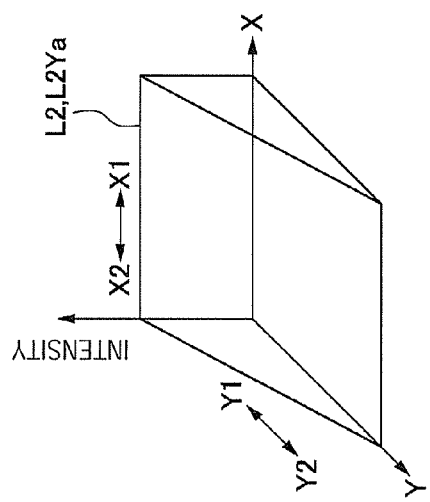
Figure 10D:
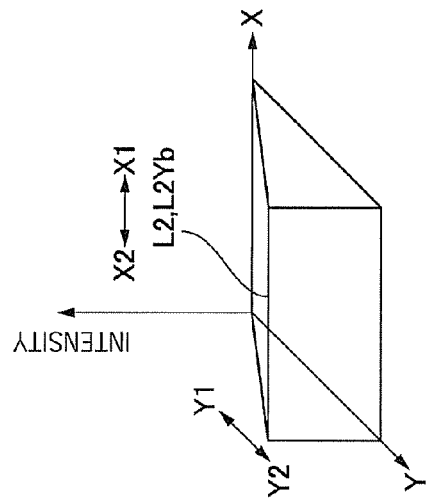

Further, if the light emitting elements 12A, 12B are in an on-state and the other light emitting elements 12 are in an off-state, there is formed the Y-coordinate detecting first light intensity distribution L2Ya (a second coordinate detecting light intensity distribution/a second coordinate detecting first light intensity distribution) in which the intensity of the detection light beam decreases monotonically in the Y-axis direction from the one side Y1 to the other side Y2 as shown in FIG. 10C. In the present embodiment, in the Y-coordinate detecting first light intensity distribution L2Ya, the intensity of the detection light beam L2 varies linearly in the Y-axis direction from the one side Y1 toward the other side Y2, and is constant in the X-axis direction. In contrast thereto, if the light emitting elements 12C, 12D are in an on-state and the other light emitting elements 12 are in an off-state, there is formed the Y-coordinate detecting second light intensity distribution L2Yb (a second coordinate detecting light intensity distribution/a second coordinate detecting second light intensity distribution) in which the intensity of the detection light beam decreases monotonically in the Y-axis direction from the other side Y2 to the one side Y1 as shown in FIG. 10D. In the present embodiment, in the Y-coordinate detecting second light intensity distribution L2Yb, the intensity of the detection light beam L2 varies linearly in the Y-axis direction from the other side Y2 toward the one side Y1, and is constant in the X-axis direction. Therefore, in the optical position detection device 10 according to the present embodiment, the Y-coordinate detection section 52 can detect the Y-coordinate of the target object Ob using a method substantially the same as the method of detecting the X-coordinate in the first embodiment.

Further, if all of the four light emitting elements 12 (the light emitting element 12A, the light emitting element 12B, the light emitting element 12C, and the light emitting element 12D) are put on, the distance detecting light intensity distribution L2Zab explained in the first embodiment with reference to FIGS. 4A and 4B is formed. In such a distance detecting light intensity distribution L2Zab, the intensity decreases monotonically along the direction of increasing the distance from the first surface 41 of the transmissive member 40, and such a variation can be made to be a linear variation by controlling the light intensity distribution within the limited space of the detection area 10R. Further, in the distance detecting light intensity distribution L2Zab, the intensity is constant along the X-axis direction and the Y-axis direction. Therefore, also in the optical position detection device 10 according to the present embodiment, similarly to the case of the first embodiment, the distance LZ (the Z-coordinate) between the target object Ob and the transmissive member 40 can be detected using the distance detecting light intensity distribution L2Zab and the detection result in the first light detector 30. On this occasion, by using the reference light beam L2r, it is possible to cancel out the influence of the outside light and so on similarly to the case of the first embodiment.

Further, also in the present embodiment, similarly to the case of the first embodiment, there is provided the second light detector 60 to which the position detecting reflected light beams L3 reflected by the target object Ob in the detection area 10R out of the detection light beams L2 emitted from the light source section 11 are not input, and the blank light beams L0 (the blank light beams L0a, L0b, L0c, and L0d) not passing through the detection area 10R enter the second light detector 60. Therefore, since the second light detector 60 can monitor the blank light beams L0 irrespective of whether or not the target object Ob exists in the detection area 10R, it is possible to set the emission intensities of the detection light beams L2 from the light source section 11 to optimum conditions based on the monitoring result. Therefore, since it is not required to monitor the blank light beams L0 by the first light detector 30, it is possible to adopt the configuration in which the position detecting reflected light beams L3 enter the first light detector 30 while the blank light beams L0 do not enter the first light detector 30. Therefore, since the influence of the blank light beams L0 is eliminated from the light reception result in the first light detector 30, there is exerted an advantage substantially the same as that of the first embodiment such that the position detection section 50 can detect the position of the target object Ob without being unnecessarily affected by the blank light beams L0.

Third Embodiment

Although in the first and second embodiments described above the optical position detection device 10 is provided with the transmissive member 40, it is also possible to apply the invention to the optical position detection device 10, which is not provided with the transmissive member 40. In the case of such a configuration, for example, a deflecting mirror for reflecting some of the detection light beam L2, which is emitted from the light source section 11, toward the second light detector 60 is disposed between the light source section 11 and the detection area 10R, and the detection light beam L2 reflected by the deflecting mirror can be used as the blank light beams L0.

First Application Example of Optical Position Detection Device 10

Figure 11A:
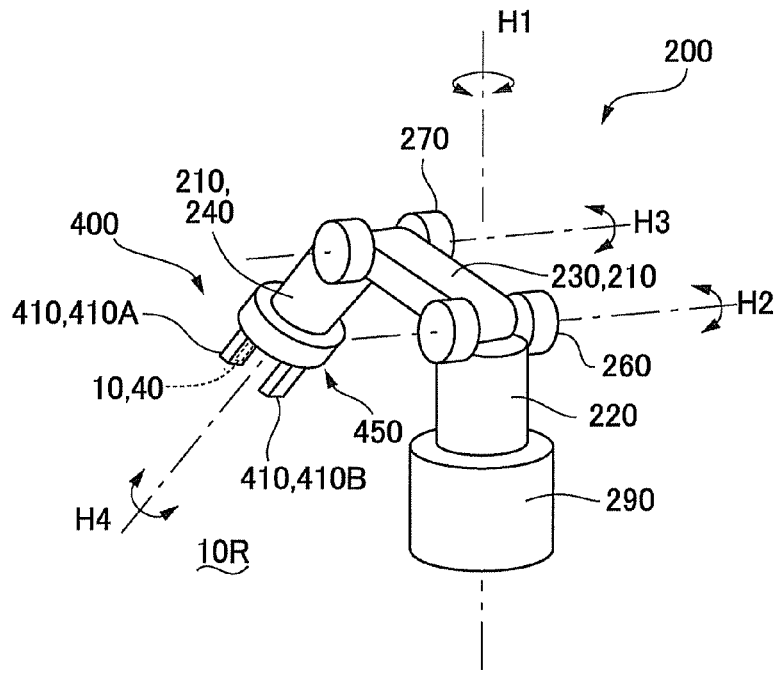
FIGS. 11A and 11B are explanatory diagrams of a robot arm using the optical position detection device to which the invention is applied as a hand device.
Figure 11B:
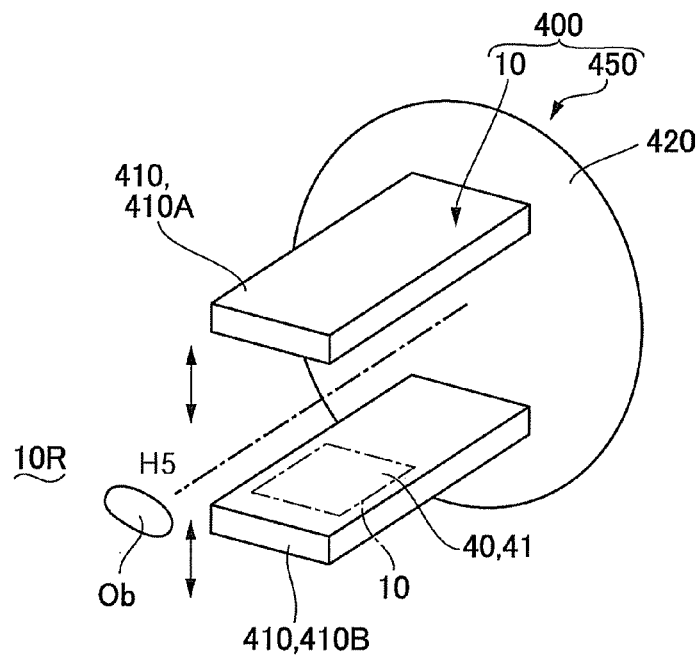

A robot hand device using the optical position detection device 10, to which the invention is applied, as a tactile sensor will be explained with reference to FIGS. 11A and 11B. FIGS. 11A and 11B are explanatory diagrams of a robot arm having the optical position detection device 10 to which the invention is applied provided to a hand device as a tactile sensor, wherein FIG. 11A is an explanatory diagram of the entire robot arm, and FIG. 11B is an explanatory diagram of the hand device.

The robot arm 200 shown in FIG. 11A is a device for performing, for example, supply and takeoff of a work or a tool to and from a numerically controlled machine tool or the like, and is provided with a column 220 erecting from a base 290, and an arm 210. In the present embodiment, the arm 210 is provided with a first arm section 230 linked to the tip portion of the column 220 via a first joint 260, and a second arm section 240 linked to the tip portion of the first arm section 230 via a second joint 270. The column 220 is capable of rotating around a shaft line H1 perpendicular to the base 290, the first arm section 230 is capable of rotating around a horizontal shaft line Hz at the tip portion of the column 220 due to the first joint 260, and the second arm section 240 is capable of rotating around a horizontal shaft line H3 at the tip portion of the first arm section 230 due to the second joint 270. At the tip portion of the second arm section 240, there is linked a hand 450 of the hand device 400, and the hand 450 is capable of rotating around a shaft line H4 of the second arm section 240.

As shown in FIG. 11B, the hand device 400 has the hand 450 provided with a plurality of gripping claws 410 (a gripping tool), and the hand 450 is also provided with a disk-shaped gripping claw holding member 420 for holding the roots of the plurality of gripping claws 410. In the present embodiment, the hand 450 is provided with a first gripping claw 410A and a second gripping claw 410B as the plurality of gripping claws 410. As indicated by the arrow H5, both of the two gripping claws 410 are capable of moving in a direction in which the gripping claws move away from each other and a direction in which the gripping claws come closer to each other.

When gripping the target object Ob in the robot arm 200 configured as described above, the column 220, the first arm section 230, and the second arm section 240 rotate in predetermined directions to thereby make the hand 450 come closer to the target object Ob (the work), and then the two gripping claws 410 move in the direction in which the two gripping claws come closer to each other to thereby grip the target object Ob.

Here, the inside surfaces of the gripping claws 410 having contact with the target object Ob when gripping the target object Ob (the work) are each composed of the first surface 41 of the transmissive member 40 of the optical position detection device 10 explained in the first and second embodiments. Therefore, when the gripping claws 410 grip the target object Ob, the optical position detection device 10 detects the relative position between the target object Ob and the gripping claws 410, and the position detection result is fed back to a drive control section of the gripping claws 410. Therefore, the gripping claws 410 can be moved closer to the target object Ob at a high speed, and therefore, speeding-up of the gripping operation of the work can be achieved. Further, in the optical position detection device 10 according to the present embodiment, since the moment when the gripping claws 410 have contact with the target object Ob can accurately be grasped, even a fragile target object Ob or an extremely soft target object Ob can be gripped without causing breakage of significant deformation to the target object Ob. In other words, when gripping the fragile target object Ob, the contact pressure of the gripping claw 410 can be set appropriately, and when gripping the soft target object Ob, a subduction amount of the gripping claws 410 to the target object Ob can be set appropriately.

Second Application Example of Optical Position Detection Device 10

Figure 12A:
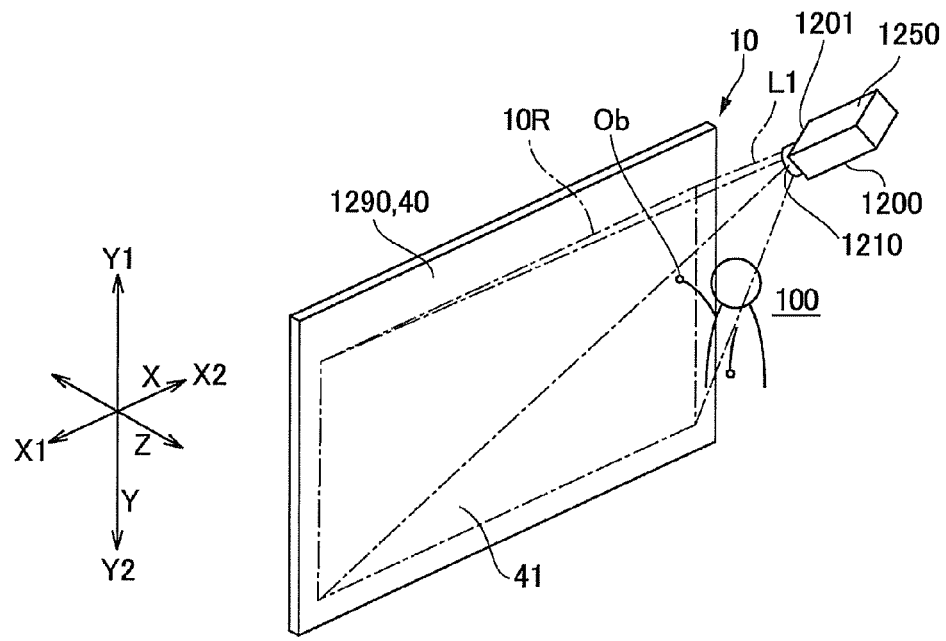
FIGS. 12A and 12B are explanatory diagrams schematically showing a display device with a position detection function having an optical position detection device, to which the invention is applied, as a touch panel.
Figure 12B:
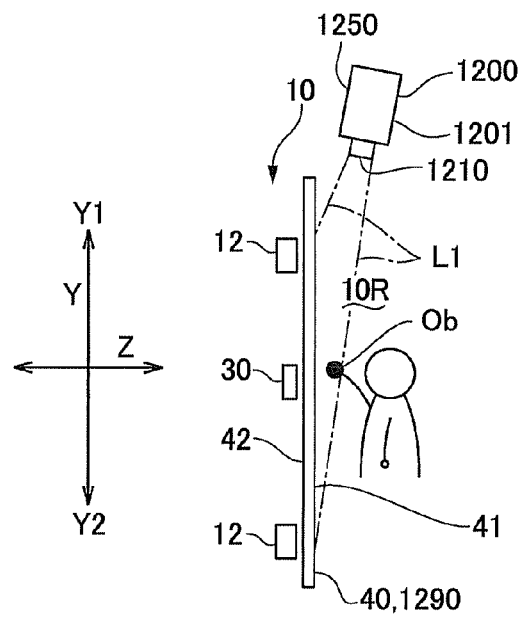

A display device using the optical position detection device 10, to which the invention is applied, as a touch panel will be explained with reference to FIGS. 12A and 12B. FIGS. 12A and 12B are explanatory diagrams schematically showing a configuration of a display device with a position detection function provided with the optical position detection device 10 to which the invention is applied as a touch panel, wherein FIG. 12A is an explanatory diagram schematically showing an appearance of a principal part of the display device with a position detection function viewed from obliquely above, and FIG. 12B is an explanatory diagram schematically showing an appearance thereof viewed from a lateral side.

The display device 100 with a position detection function shown in FIGS. 12A and 12B is a projection display device and is provided with an image projection device 1200 called a liquid crystal projector or a digital micromirror device. Such an image projection device 1200 projects an image display light beam L1 in an enlarged manner from a projection lens 1210 provided to a front face section 1201 of a housing 1250 toward the screen member 1290.

The display device 100 with a position detection function according to the present embodiment is provided with a function of optically detecting the position of the target object Ob in the detection area 10R set in a front space (in front of the screen member 1290) from which the image is projected, and displays the image in an area overlapping the detection area 10R. The display device 100 with a position detection function according to the present embodiment treats the XY-coordinate of the target object Ob as input information for designating, for example, a part of the image thus projected, and performs, for example, switching of the image based on the input information.

With a view to realizing such a position detection function, in the display device 100 with a position detection function according to the present embodiment, the optical position detection device 10 explained in the first and second embodiments is used as a touch panel, and the screen member 290 is composed of the transmissive member 40 of the optical position detection device 10. Therefore, the screen surface on which the image is viewed in the screen member 290 is used as an input surface composed of the first surface 41 of the transmissive member 40, and on the side of the reverse side (the second surface 42 of the transmissive member 40) of the screen member 290, there are disposed the light source section 11 provided with the light emitting elements 12 for the detection light beams, and the first light detector 30.

In the display device 100 with a position detection function thus configured, when indicating the image displayed on the screen member 290 with the target object Ob such as a fingertip, the XY-coordinate and so on of the target object Ob are detected, and the position of the target object Ob can be treated as input information.

What is claimed is:

1. A position detection device adapted to detect a position of a target object, comprising:
    a light source section forming a light intensity distribution of a detection light beam;
    a first light detector receiving a reflected light beam of the detection light beam reflected by the target object;
    a transmissive member disposed between a detection area and the light source section, and between the detection area and the first light detector;
    a second light detector receiving a light beam reflected by the transmissive member out of the detection light beam emitted from the light source section; and
    a light blocking member disposed between the second light detector and the transmissive member, and adapted to block the reflected light beam.

2. The position detection device according to claim 1, wherein
    the second light detector is disposed at a position overlapping the first light detector in a plan view with respect to a flat surface of the transmissive member.

3. The position detection device according to claim 1, wherein
    the light source section forms a first light intensity distribution in which the intensity varies in a direction from a first side toward a second side opposite to the first side in the detection area, and a second light intensity distribution having an intensity variation in a direction from the second side toward the first side that is different from the first light intensity distribution, and
    the position detection device detects a position of the target object based on a comparison result between a detection result in the first light detector when forming the first light intensity distribution, and a detection result in the first light detector when forming the second light intensity distribution.

4. The position detection device according to claim 1, wherein
    the light source section forms a first light intensity distribution in which the intensity varies in a direction from a first side toward a second side opposite to the first side in the detection area, and a second light intensity distribution having an intensity variation in a direction from the second side toward the first side that is different from the first light intensity distribution, and varies an emission intensity of the detection light beam so that the detection result in the first light detector when forming the first light intensity distribution and the detection result in the first light detector when forming the second light intensity distribution become equal to each other, and
    the position detection device detects a position of the target object based on one of the emission intensity of the detection light beam after varying the emission intensity of the detection light beam and the detection result in the second light detector.

5. The position detection device according to claim 3, wherein environment light enters the first light detector and the second light detector.

6. A hand device provided with a position detection device adapted to detect a position of a target object, comprising:
    a light source section forming a light intensity distribution of a detection light beam;
    a first light detector receiving a reflected light beam of the detection light beam reflected by the target object;
    a transmissive member disposed between a detection area and the light source section, and between the detection area and the first light detector;
    a second light detector receiving a light beam reflected by the transmissive member out of the detection light beam emitted from the light source section;
    a light blocking member disposed between the second light detector and the transmissive member, and adapted to block the reflected light beam; and
    a hand adapted to grip the target object.

7. A display device with a position detection function adapted to detect a position of a target object, comprising:
    a light source section forming a light intensity distribution of a detection light beam;
    a first light detector receiving a reflected light beam of the detection light beam reflected by the target object;
    a transmissive member disposed between the detection area and the light source section, and between a detection area and the first light detector;
    a second light detector receiving a light beam reflected by the transmissive member out of the detection light beam emitted from the light source section;
    a light blocking member disposed between the second light detector and the transmissive member, and adapted to block the reflected light beam; and
    an image generation device adapted to display an image.

* * * * *